United States Patent [19]
Yoshinari et al.

[11] Patent Number: 6,031,793
[45] Date of Patent: Feb. 29, 2000

[54] MAGNETO-OPTICAL RECORDING MEDIUM WITH A LAYER TO ENLARGE MAGNETIC DOMAINS

[75] Inventors: Jiro Yoshinari; Shinji Miyazaki; Hiroyasu Inoue, all of Nagano, Japan

[73] Assignee: TDK Corporation, Tokyo, Japan

[21] Appl. No.: 09/058,292

[22] Filed: Apr. 10, 1998

[30] Foreign Application Priority Data

Apr. 10, 1997 [JP] Japan ................................. 9-108090

[51] Int. Cl.$^7$ ................................................. G11B 11/10
[52] U.S. Cl. ........................... 369/13; 369/283; 369/288; 369/275.2; 428/694 MM; 428/694 EC
[58] Field of Search ............................ 369/13, 288, 283, 369/275.2; 428/694 RE, 694 MM, 694 EC; 360/59, 114

[56] References Cited

U.S. PATENT DOCUMENTS

| | | | |
|---|---|---|---|
| 5,210,724 | 5/1993 | Kobayashi | 369/13 |
| 5,218,581 | 6/1993 | Ohta et al. | 369/13 |
| 5,864,520 | 1/1999 | Fukamachi et al. | 369/13 |
| 5,879,822 | 3/1999 | Okada | 428/694 RE |

FOREIGN PATENT DOCUMENTS 8-007350  1/1996  Japan .

Primary Examiner—Tan Dinh
Assistant Examiner—Kim-Kwok Chu
Attorney, Agent, or Firm—Laubscher & Laubscher; R. J. Lasker

[57] ABSTRACT

In reading a magneto-optical recording medium comprising a substrate and a magnetic multilayer on a surface of the substrate, which multilayer comprises, in order from the surface of the substrate, an amplifying layer $A_1$, a control layer $C_2$, and a recording layer $R_3$ with a magnetic domain formed therein, the medium is first irradiated with a laser beam while a reading magnetic field is applied thereto in one direction. With the resulting temperature increase, the magnetic domain in $R_3$ is successively copied from $C_2$ to $A_1$ to form copied magnetic domains, which are in turn enlarged by a reading magnetic field. Then, the enlarged, copied magnetic domain in $A_1$ is read out. Thereupon, laser beam irradiation is interrupted or the power of the laser beam is decreased to thereby vanish the copied magnetic domains in $A_1$ and $C_2$. To carry out reading by light intensity modulation, an interface wall exchange force magnetic field between the respective magnetic layer, etc. is controlled, so that reading can take place with no application of a modulated magnetic field.

16 Claims, 10 Drawing Sheets

AFTER RECORDING

INITIALIZATION

COPY

ENLARGEMENT

VANISHING

AFTER RECORDING

INITIALIZATION

↑
INITIALIZING MAGNETIC FIELD $H_I$
OR
READING MAGNETIC FIELD $H_R$

COPY

↑
READING MAGNETIC FIELD $H_R$

ENLARGEMENT

↑
READING MAGNETIC FIELD $H_R$

VANISHING

↑
READING MAGNETIC FIELD $H_R$

FIG. 3A
AFTER RECORDING
FIG. 3B
INITIALIZATION
FIG. 3C
COPY
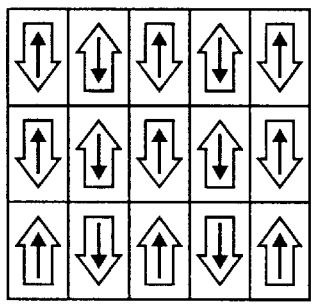
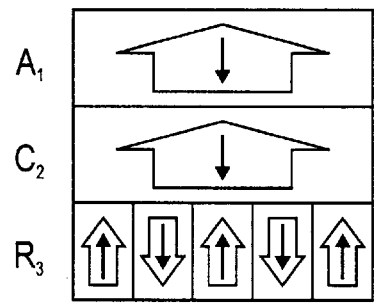
INITIALIZING MAGNETIC FIELD $H_I$
OR
READING MAGNETIC FIELD $H_R$
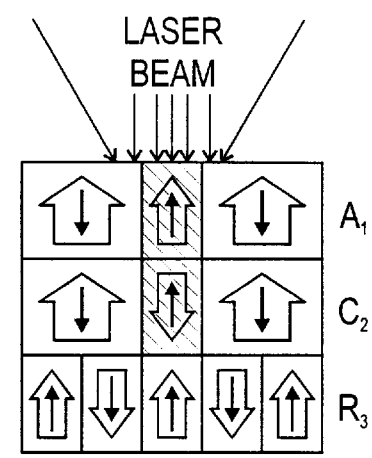
READING MAGNETIC FIELD $H_R$
FIG. 3D
ENLARGEMENT
FIG. 3E
VANISHING
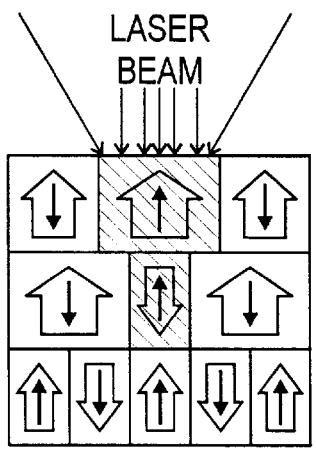
READING MAGNETIC FIELD $H_R$
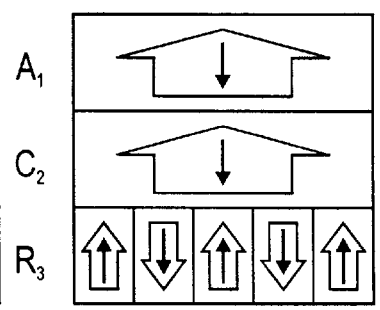
READING MAGNETIC FIELD $H_R$

FIG. 4A
AFTER RECORDING
FIG. 4B
INITIALIZATION
INITIALIZING MAGNETIC FIELD $H_I$
FIG. 4C
COPY
LASER BEAM
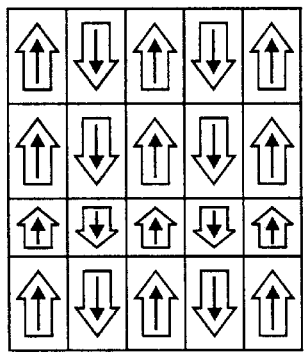
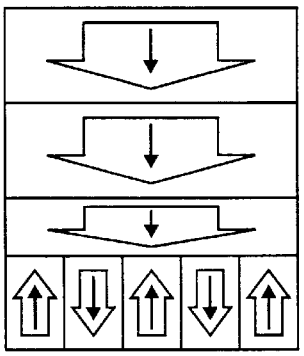
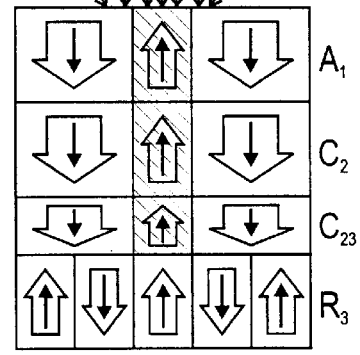
READING MAGNETIC FIELD $H_R$
FIG. 4D
ENLARGEMENT
LASER BEAM
FIG. 4E
VANISHING
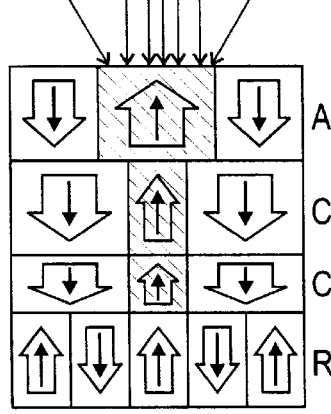
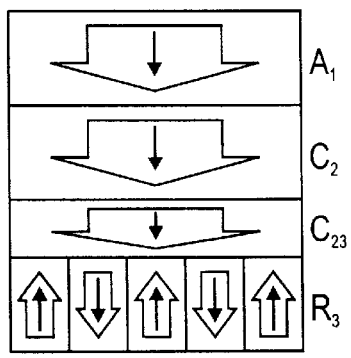
READING MAGNETIC FIELD $H_R$
READING MAGNETIC FIELD $H_R$

FIG. 5A
AFTER RECORDING
FIG. 5B
INITIALIZATION
INITIALIZING MAGNETIC FIELD $H_I$
FIG. 5C
COPY
LASER BEAM
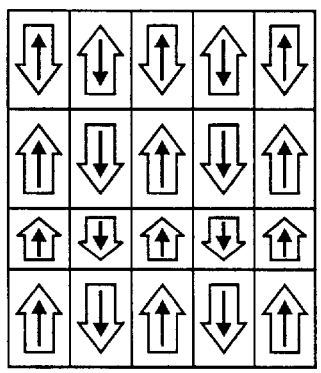
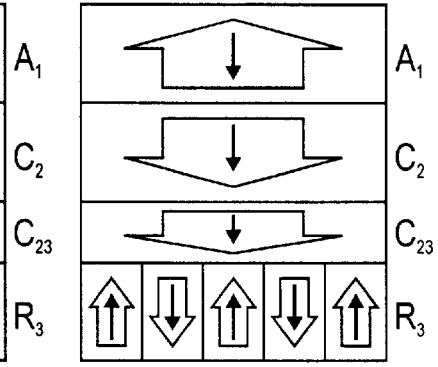
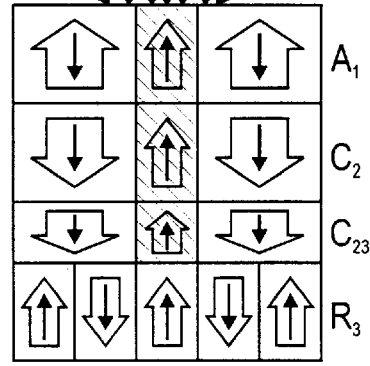
READING MAGNETIC FIELD $H_R$
FIG. 5D
ENLARGEMENT
LASER BEAM
FIG. 5E
VANISHING
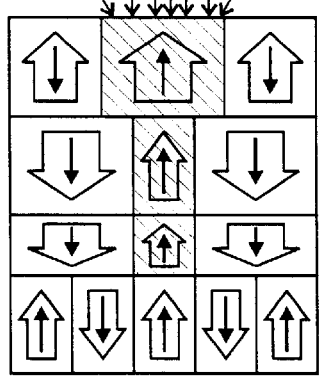
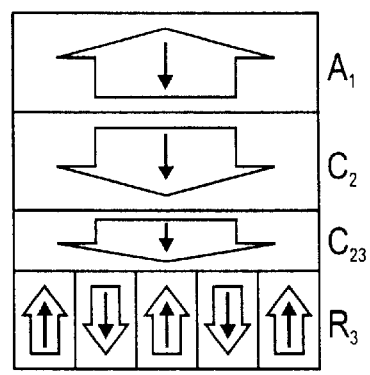
READING MAGNETIC FIELD $H_R$
READING MAGNETIC FIELD $H_R$

FIG. 6A
AFTER RECORDING
FIG. 6B
INITIALIZATION
INITIALIZING MAGNETIC FIELD $H_I$
FIG. 6C
COPY
LASER BEAM
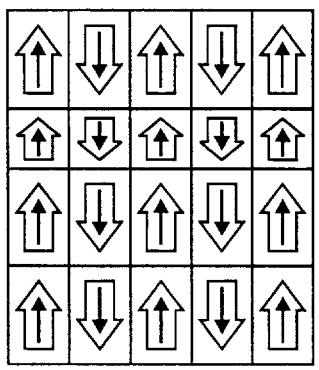
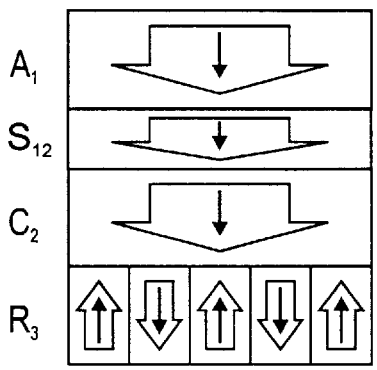
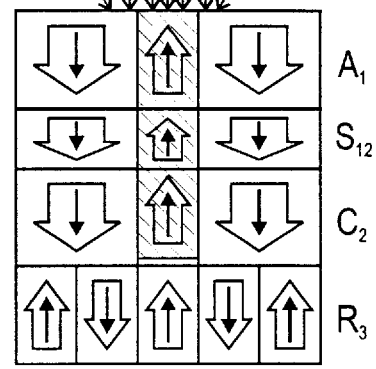
READING MAGNETIC FIELD $H_R$
FIG. 6D
ENLARGEMENT
LASER BEAM
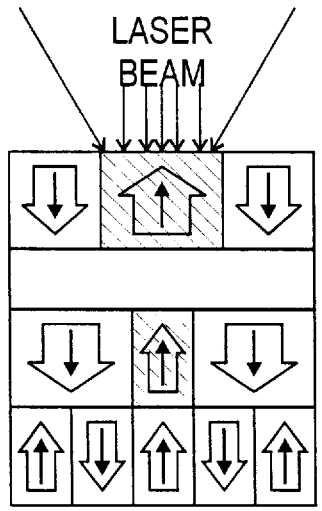
READING MAGNETIC FIELD $H_R$
FIG. 6E
VANISHING
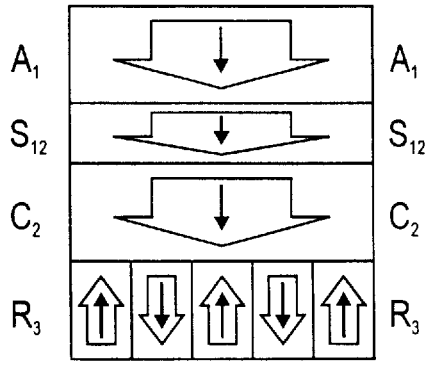
READING MAGNETIC FIELD $H_R$

FIG. 7A
AFTER RECORDING
FIG. 7B
INITIALIZATION
FIG. 7C
COPY
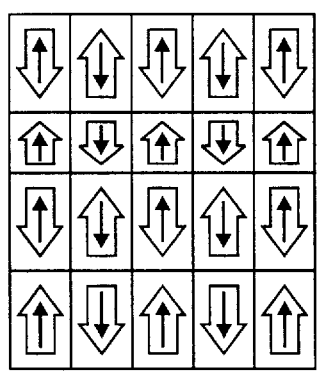
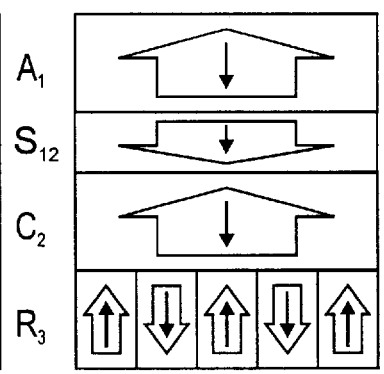
INITIALIZING MAGNETIC FIELD $H_I$
OR
READING MAGNETIC FIELD $H_R$
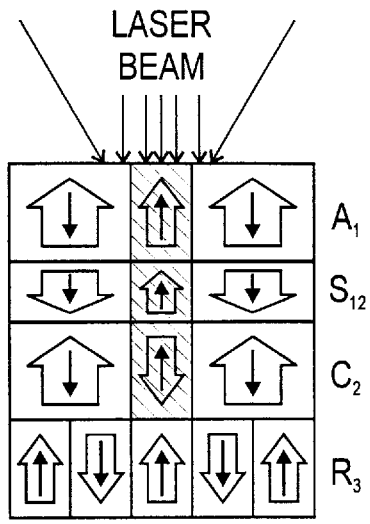
READING MAGNETIC FIELD $H_R$
FIG. 7D
ENLARGEMENT
FIG. 7E
VANISHING
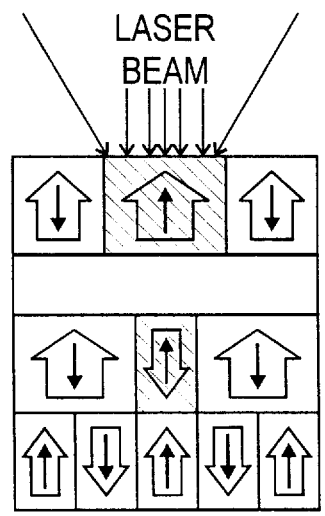
READING MAGNETIC FIELD $H_R$
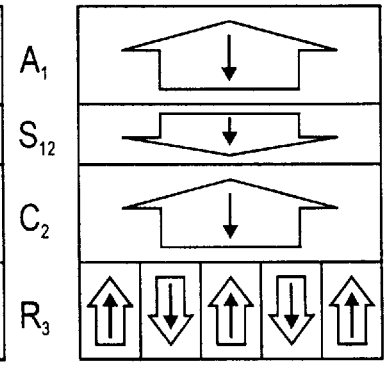
READING MAGNETIC FIELD $H_R$

MAGNETO-OPTICAL RECORDING MEDIUM WITH A LAYER TO ENLARGE MAGNETIC DOMAINS

BACKGROUND OF THE INVENTION

1. Technical Field

The present invention relates to a magneto-optical recording medium capable of amplifying output signals by enlarging recorded magnetic domains upon reading, and a reading method.

2. Background Technique

In a magneto-optical recording medium, a magnetic thin film thereof is locally heated by laser beam irradiation or other light irradiation to decrease its coercive force. Then, an external magnetic field is applied to the magnetic thin film to invert the direction of magnetization of the irradiated spots or maintain the initial magnetization direction, thereby forming magnetic domains (recorded marks). The direction of magnetization of the magnetic domains is read out by the Kerr or Faraday effect.

In an ordinary magneto-optical recording medium, the available density of readable magnetic domains is limited by the spot diameter of the laser beam used for reading, and so it is impossible to read magnetic domains having a diameter smaller than that the half of the laser beam spot diameter.

For a magneto-optical recording medium capable of reading magnetic domains having a diameter smaller than the half of laser beam spot diameter, for instance, JP-A 8-7350 discloses a magneto-optical recording medium capable of enlarging recorded magnetic domains. This magneto-optical recording medium comprises a three-layered recording film comprising, in order from an substrate side, a first magnetic layer, a second magnetic layer, and a third magnetic layer which are exchange coupled together. Upon reading, the substrate of the medium is irradiated with a laser beam while a reading magnetic field is applied to the recording film of the medium. The third magnetic layer holds recorded magnetic domains, which are copied by laser beam irradiation to the first, and second magnetic layers. The copied magnetic domains are enlarged in the longitudinal direction of each magnetic layer by reading magnetic field. The enlarged, copied magnetic domains are read out as is the case with a conventional magneto-optical recording medium. After the reading of the enlarged, copied magnetic domains has finished, an erasing magnetic field opposite in direction to the reading magnetic field is applied to erase off the copied magnetic domains for the next reading of adjacent recorded magnetic domains. By repetition of such a process, it is possible to read minute magnetic domains unreadable so far in the art. Furthermore, this method does not only achieve high resolution upon reading, but also enables output signal intensity to be in itself augmented because the magnetic domains are actually enlarged.

For this reading method, however, it is required to apply the reading, and erasing magnetic fields, viz., a modulated magnetic field depending on the recording density of magnetic domains. For instance, when the magnetic domains recorded by magnetic field modulation are read by the aforesaid method, the frequency of the modulated magnetic field upon reading is at least twice as high as that of the modulated magnetic field upon recording. For the application of a high-frequency modulated magnetic field, it is required to keep a magnetic head as close to the recording film as possible and, hence, make use of a magnetic head of the type that slides over the surface of the medium. For this reason, the recording film, a protective film formed on its surface, etc. should have sliding robustness. This renders it impossible to use a double-sided recording medium comprising a laminated substrate; there is no option but to use a single plate type medium having a reduced recording capacity per plate. An additional problem with the single plate type medium is that the substrate cannot be made thin because it is required to make sure of rigidity. For this reason, when a resin substrate with high birefringence is used, it is difficult to converge a laser beam and, hence, it is impossible to obtain high recording density. Furthermore, there are technical or cost-relating limits to high frequencies allowed for magnetic field-generating means. These limits in turn lead to limits to readable recording density as well as to an improvement in the transfer rate due to fast reading.

In the "scope of what is claimed", the aforesaid JP-A 8-7350 recites that reading takes place through the modulation of a magnetic field and/or reading light. That is, it is recited that to enlarge the recorded magnetic domains for reading, only the modulation of reading light is needed. In the "detailed explanation of the invention", however, the publication refers merely to a method of erasing off the magnetic domains by the application of a magnetic field opposite in direction to a reading magnetic field. In other words, there is only a disclosure to the effect that the pulse modulation of reading light is to achieve S/N improvements. In the example given therein, the magnetic domains recorded at a modulation frequency of 2.5 MHz are read by the modulation at 5 MHz of optical pulses and magnetic field with a sample clock timing. However, the erasure of magnetic domains cannot be achieved only by the modulation of optical pulses, as can be understood from the fact that a reading magnetic field of −100 Oe is applied; that is, a magnetic field of 100 Oe is applied in the reverse direction to the reading magnetic field.

SUMMARY OF THE INVENTION

An object of the present invention is to provide a magneto-optical recording medium of the type that comprises a magnetic layer of a multilayer structure, and copies and enlarges recorded magnetic domains for reading purposes, wherein the recorded magnetic domains can be read with no application of a modulated magnetic field.

The aforesaid object is achieved by the embodiments of the invention defined below as (1) to (16).

(1) A method of reading a magneto-optical recording medium comprising a substrate, and a magnetic multilayer comprising three magnetic layers or, in order from a surface side of said substrate, an amplifying layer $A_1$, a control layer $C_2$, and a recording layer $R_3$ with a magnetic domain recorded therein by magneto-optical recording, which method comprises a process, wherein:

said magnetic multilayer is irradiated with a laser beam while a reading magnetic field providing one magnetic field is applied to said magnetic multilayer to successively copy said magnetic domain in said recording layer $R_3$ from said control layer $C_2$ to said amplifying layer $A_1$ by a temperature increase due to laser beam irradiation, thereby forming a copied magnetic domain, said copied magnetic domain in said amplifying layer $A_1$ is enlarged by said reading magnetic field, and upon reading of an enlarged copied magnetic domain in said amplifying layer $A_1$, copied magnetic domains in said amplifying layer $A_1$ and said control layer $C_2$ are vanished by interrupting said laser beam irradiation or decreasing laser beam power.

(2) A magneto-optical recording medium comprising a substrate, and a magnetic multilayer on a surface side of said substrate, said magnetic multilayer comprising at least three layers or, in order from said surface side, an amplifying layer $A_1$, a control layer $C_2$ and a recording layer $R_3$, in which:

upon recording, a magnetic domain is formed in said recording layer $R_3$ by laser beam irradiation and application of a recording magnetic filed, and upon reading, said magnetic domain in said recording layer $R_3$ is successively copied by laser beam irradiation and application of a reading magnetic field to said control layer $C_2$ and said amplifying layer $A_1$ to form copied magnetic domains in the respective layers, and a copied magnetic domain in said amplifying domain $A_1$ is enlarged, wherein:

in a range of temperature that is higher than room temperature and lower than a Curie temperature $Tc_{A1}$ of said amplifying layer $A_1$ and a Curie temperature $Tc_{c2}$ of said control layer $C_2$, a temperature $T_1$ at which $$Hw_{A1C2} = Hw_{C2R3}$$

exists, and a temperature at which $Hw_{A1C2}$ reaches a maximum exists on a side of temperature that is lower than $T_1$ while a temperature at which $Hw_{C2R3}$ reaches a maximum exists on a side of temperature that is higher than $T_1$, with the proviso that $Hw_{A1C2}$ is the effective magnetic field caused by the interface wall between said amplifying layer $A_1$ and said control layer $C_2$ on said amplifying layer $A_1$ and $Hw_{C2R3}$ is the effective magnetic field caused by the interface wall between said control layer $C_2$ and said recording layer $R_3$ on said control layer $C_2$.

(3) The magneto-optical recording medium according to (2), wherein said amplifying layer $A_1$ and said control layer $C_2$ are each formed of a ferrimagnetic material having a compensation temperature that is higher than room temperature, and satisfy $$Tcomp_{A1} < Tcomp_{C2}$$

with the provision that $Tc_{A1}$ is the Curie temperature of said amplifying layer $A_1$, $Tcomp_{A1}$ is a compensation temperature of said amplifying layer $A_1$, and $Tcomp_{C2}$ is a compensation temperature of said control layer $C_2$.

(4) The magneto-optical recording medium according to (2), wherein said control layer $C_2$ is formed of a ferrimagnetic material having a compensation temperature that is higher than room temperature.

(5) The magneto-optical recording medium according to (2), wherein said magnetic multilayer further comprises an exchange force control layer $C_{23}$ between said control layer $C_2$ and said recording layer $R_3$, and satisfies $$Tc_{C2} < Tc_{C23}$$

where $Tc_{C2}$ is the Curie temperature of said control layer $C_2$ and $Tc_{C23}$ is a Curie temperature of said exchange force control layer $C_{23}$.

(6) The magneto-optical recording medium according to (2), which, at a temperature at which said copied magnetic domain in said amplifying layer $A_1$ is enlarged, satisfies $$Hc_{A1} > Hw_{A1}$$

where $Hc_{A1}$ is a coercive force of said amplifying layer $A_1$, and $Hw_{A1}$ is the effective magnetic field caused by the Bloch wall on said amplifying layer $A_1$.

(7) The magneto-optical recording medium according to (2), wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is the Curie temperature of said amplifying temperature $A_1$.

(8) The magneto-optical recording medium according to (2), which is read by the reading method according to (1).

(9) A magneto-optical recording medium comprising a substrate, and a magnetic multilayer on a surface side of said substrate, said magnetic multilayer comprising at least four layers or, in order from said surface side, an amplifying layer $A_1$, a switching layer $S_{12}$, a control layer $C_2$ and a recording layer $R_3$, in which:

upon recording, a magnetic domain is formed in said recording layer $R_3$ by laser beam irradiation and application of a recording magnetic filed, and upon reading, said magnetic domain in said recording layer $R_3$ is successively copied by laser beam irradiation and application of a reading magnetic field to said control layer $C_2$, said switching layer $S_{12}$ and said amplifying layer $A_1$ to form copied magnetic domains in the respective layers, and a copied magnetic domain in said amplifying domain $A_1$ is enlarged, wherein:

a Curie temperature $Tc_{S12}$ of said switching layer $S_{12}$ is higher than room temperature, and satisfies $$Tc_{S12} < Tc_{A1}$$

where $Tc_{A1}$ is a Curie temperature of said amplifying layer $A_1$, and in a range of temperature that is higher than room temperature and lower than $Tc_{S12}$, a temperature $T_2$ at which $$Hw_{A1S12} = Hw_{C2R3}$$

exists, and a temperature at which $Hw_{A1S12}$ reaches a maximum exists on a side of temperature that is lower than $T_2$ while a temperature at which $Hw_{C2R3}$ reaches a maximum exists on a side of temperature that is higher than $T_2$, with the proviso that $Hw_{A1S12}$ is the effective magnetic field caused by the interface wall between said amplifying layer $A_1$ and said switching layer $S_{12}$ on said amplifying layer $A_1$ and $Hw_{C2R3}$ is the effective magnetic field caused by interface wall between said control layer $C_2$ and said recording layer $R_3$ on said control layer $C_2$.

(10) The magneto-optical recording medium according to (9), wherein said amplifying layer $A_1$ and said control layer $C_2$ are each formed of a ferrimagnetic material having a compensation temperature that is higher than room temperature, and satisfy $$Tcomp_{A1} < Tcomp_{C2}$$

with the proviso that $Tc_{S12}$ is the Curie temperature of said switching layer $S_{12}$, $Tcomp_{A1}$ is a compensation temperature of said amplifying layer $A_1$, and $Tcomp_{C2}$ is a compensation temperature of said control layer $C_2$.

(11) The magneto-optical recording medium according to (9), wherein said control layer $C_2$ is formed of a ferrimagnetic material having a compensation temperature that is higher than room temperature.

(12) The magneto-optical recording medium according to (9), wherein said magnetic multilayer further comprises an exchange force control layer $C_{23}$ between said control layer $C_2$ and said recording layer $R_3$, and satisfies $$Tc_{C2} < Tc_{C23}$$

where $Tc_{C2}$ is a Curie temperature of said control layer $C_2$ and $Tc_{C23}$ is a Curie temperature of said exchange force control layer $C_{23}$.

(13) The magneto-optical recording medium according to (9), which, at a temperature at which said copied magnetic domain in said amplifying layer $A_1$ is enlarged, satisfies $$Hc_{A1} > Hw_{A1}$$

where $Hc_{A1}$ is a coercive force of said amplifying layer $A_1$, and $Hw_{A1}$ is the effective magnetic field caused by the Bloch wall on said amplifying layer $A_1$.

(14) The magneto-optical recording medium according to (9), wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is the Curie temperature of said amplifying temperature $A_1$.

(15) The magneto-optical recording medium according to (9), which is read by the reading method according to (1).

(16) A magneto-optical recording medium comprising a substrate, and a magnetic multilayer on said substrate, said magnetic multilayer comprising at least four layers or, in order from the surface, an amplifying layer $A_1$, a switching layer $S_{23}$, a control layer $C_2$ and a recording layer $R_3$, in which:

upon recording, a magnetic domain is formed in said recording layer $R_3$ by laser beam irradiation and application of a recording magnetic filed, and upon reading, said magnetic domain in said recording layer $R_3$ is successively copied by laser beam irradiation and a reading magnetic field to said switching layer $S_{23}$, said control layer $C_2$ and said amplifying layer $A_1$ to form copied magnetic domains in the respective layers, and a copied magnetic domain in said amplifying domain $A_1$ is enlarged, wherein:

said switching layer $S_{23}$ is formed of a ferrimagnetic material having a compensation temperature that is higher than room temperature, and has magnetization in a longitudinal direction at a temperature from room temperature to approximately said compensation temperature, and magnetization in a perpendicular direction at a temperature that is higher than approximately said compensation temperature, and in a range of temperature that is higher than room temperature and lower than a Curie temperature $Tc_{A1}$ of said amplifying layer $A_1$ and a Curie temperature $Tc_{C2}$ of said control layer $C_2$, a temperature $T_3$ at which $$Hw_{A1C2} = Hw_{C2S23}$$

exists, and a temperature at which $Hw_{A1C2}$ reaches a maximum exists on a side of temperature that is lower than $T_3$ while a temperature at which $Hw_{C2S23}$ reaches a maximum exists on a side of temperature that is higher than $T_3$, with the proviso that $Hw_{A1C2}$ is the effective magnetic field caused by interface wall between said amplifying layer $A_1$ and said control layer $C_2$ on said amplifying layer $A_1$ and $Hw_{C2S23}$ is the effective magnetic field caused by interface wall exchange force magnetic field between said control layer $C_2$ and said switching layer $S_{23}$ on said control layer $C_2$

(17) The magneto-optical recording medium according to (16), which, at a temperature at which said copied magnetic domain in said amplifying layer $A_1$, satisfies $$Hc_{A1} > Hw_{A1}$$

where $Hc_{A1}$ is a coercive force of said amplifying layer $A_1$, and $Hw_{A1}$ is the effective magnetic field caused by Bloch wall on said amplifying layer $A_1$.

(18) The magneto-optical recording medium according to (16), wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is the Curie temperature of said amplifying temperature $A_1$.

(19) The magneto-optical recording medium according to (16), which is read by the reading method according to (1).

BRIEF DESCRIPTION OF THE DRAWINGS

FIGS. 3A to 3E are schematic views illustrative of a reading process for the magneto-optical recording medium according to the present invention.

FIGS. 4A to 4E are schematic views illustrative of a reading process for the magneto-optical recording medium according to the present invention.

FIGS. 5A to 5E are schematic views illustrative of a reading process for the magneto-optical recording medium according to the present invention.

FIGS. 6A to 6E are schematic views illustrative of a reading process for the magneto-optical recording medium according to the present invention.

FIGS. 7A to 7E are schematic views illustrative of a reading process for the magneto-optical recording medium according to the present invention.

EXPLANATION OF THE PREFERRED EMBODIMENTS

Figure 1A:
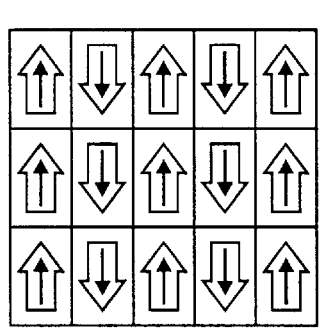
FIGS. 1A to 1E are schematic views illustrative of a reading process for the magneto-optical recording medium according to the present invention.

The present invention includes constructions I, II, and III as explained below. An embodiment of each construction will now be explained.

Construction I

Used in construction I is a magneto-optical recording medium comprising a substrate, and a magnetic multilayer comprising at least three layers or, in order of a surface of said substrate, an amplifying layer $A_1$, a control layer $C_2$, and a recording layer $R_3$ with a magnetic domain recorded therein by magneto-optical recording. For the reading of this magneto-optical recording medium, an initializing magnetic field is first applied to the magnetic multilayer in a perpendicular direction thereto, if required. Then, the magnetic domain in the recording layer $R_3$ is successively copied by laser beam irradiation from the control layer $C_2$ to the amplifying layer $A_1$ to form copied magnetic domains in the respective layers. At the same time, the copied magnetic domain in the amplifying layer $A_1$ is enlarged by the application of a reading magnetic field. The direction of the reading magnetic field varies depending on the structure of the magnetic multilayer, and is in the same as or opposite to the initializing magnetic field. Then, the enlarged magnetic domain is read out of the amplifying layer $A_1$. Thereupon, the laser beam irradiation is interrupted or the power of the laser beam is reduced, thereby vanishing the magnetic domains copied the respective amplifying and control layers $A_1$ and $C_2$. Subsequently, a magnetic domain adjacent to the magnetic domain the reading of which has finished is read. With this reading process with no need of applying an alternative magnetic field, the reading magnetic field is applied to the magnetic multilayer in one direction while the magnetic multilayer is irradiated with a laser beam, so that the copy of magnetic domains, the enlargement of the copied magnetic domains, the reading of the enlarged magnetic domains, and the vanishing of the read magnetic domains can occur continuously.

Construction I encompasses sub-constructions I-1, I-2, and I-3 as explained below.

Sub-construction I-1

In what follows, the reading process for construction I-1 that is a fundamental makeup of construction I, along with the conditions required therefor, will be explained in detail with reference to FIGS. 1A to 1E as well as FIG. 8.

Reading Process (Construction I-1)

Case Where the Magnetic Domains Have Magnetization in the Same Direction as the Reading Magnetic Field FIGS. 1A to 1E are schematic illustrations of the direction of magnetization of each magnetic layer in the magnetic multilayer, wherein a large white arrow indicates the direction of magnetization of the overall magnetic layer while a small black arrow stands for the direction of spins in the transition metal element in the magnetic layer. This is also true of the schematic illustrations of FIG. 2A to 2E, etc. When the magnetic layer has not a compensation temperature that is higher than room temperature, both arrows are aligned. In the construction shown in FIGS. 1A to 1E, all the magnetic layers have not a compensation temperature that is higher than room temperature.

An account is first given of the reading of some magnetic domains out of the magnetic domains recorded in the recording layer $R_3$, viz., those having magnetization in the same direction as the reading magnetic field or those having upward magnetization in FIGS. 1A to 1E.

FIG. 1A: State of the Medium After Recording

As shown in FIG. 1A, magnetic domains are recorded in the recording layer $R_3$ by magneto-optical recording. Magnetic domains having magnetization in the same direction as the recording layer $R_3$, are copied by the interface wall exchange force in the amplifying layer $A_1$ and control layer $C_2$.

Figure 1B:
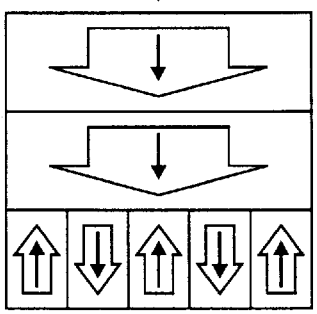

FIG. 1B: Initialization

As shown in FIG. 1B, an initializing magnetic field $H_I$ is applied to the magneto-optical recording medium in this state. The initializing magnetic field is applied to the medium via an initializing magnetic head. The initializing magnetic head is located at a position away from a reading magnetic head to be described later. By the application of the initializing magnetic field $H_I$, the amplifying layer $A_1$ and control layer $C_2$ have magnetization in the same direction as the initializing magnetic field. It is here to be noted that the initializing magnetic field applied in construction I-1 is in the reverse direction to the reading magnetic field.

Figure 1C:
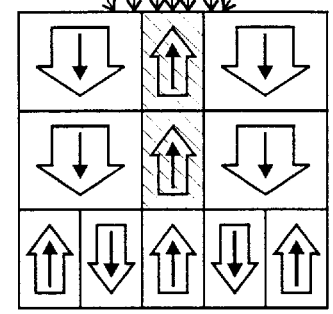

FIG. 1C: Copy of the Magnetic Domains

After the application of the initializing magnetic field, the medium is irradiated with a laser beam while a reading magnetic field $H_R$ is applied thereto. Usually, the reading magnetic head for the application of the reading magnetic field is opposed to an optical pickup for laser beam irradiation with the medium located between them. The medium is irradiated from the substrate side with the laser beam. The reading magnetic field $H_R$ is a DC magnetic field opposite in direction to the initializing magnetic field $H_I$, and is continuously applied during reading. On the other hand, the laser beam is pulse modulated in such a way as to provide a cycle per one of the magnetic domains (recorded marks) to be read. The laser beam, with which the medium is irradiated in FIG. 1C, is put in an on-state when the optical pickup moves to the vicinity of the magnetic domain to be read.

The temperature of each magnetic layer is increased by laser beam irradiation, so that the interface wall exchange force between the recording layer $R_3$ and the control layer $C_2$, and the interface wall exchange force between the control layer $C_2$ and the amplifying layer $A_1$ can become strong. This in turn causes the recorded magnetic domain in the recording layer $R_3$ to be copied to the control layer $C_2$, from which it is then copied to the amplifying layer $A_1$. The magnetization of the magnetic domains copied to the control layer $C_2$ and the amplifying layer $A_1$, respectively, is in the reverse direction to the initializing magnetic field.

Figure 1D:
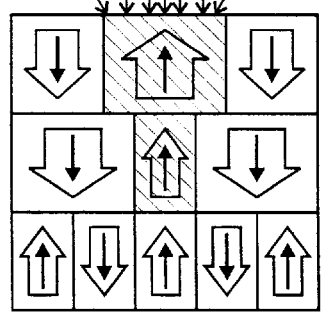

FIG. 1D: Enlargement of Copied Magnetic Domains

Upon copy of magnetic domains by laser beam irradiation, the magnetic domains in each magnetic layer tend to become large in the longitudinal direction thereof because each magnetic layer receives the reading magnetic field $H_R$ having magnetization in the same direction as the copied magnetic domains. At this time, the magnetic domains in the amplifying layer $R_3$ are enlarged although the magnetic domains in the recording, and control layers $R_3$, and $C_2$ are not enlarged. The recording layer $R_3$, for instance, is preset such that high coercive force is obtained even at the temperature of laser beam irradiation, so that the magnetic domains therein are not enlarged. On the other hand, the control layer $C_2$, for instance, is preset such that the interface wall exchange force between it and the recording layer $R_3$ and the Bloch wall exchange force impose sufficient constraints on the magnetic domains therein, so that the magnetic domains are not enlarged. Furthermore, the amplifying layer $A_1$, for instance, is preset such that the interface wall exchange force between it and the control layer $C_2$ becomes weak to such an extent that the magnetic domains therein can be enlarged against the Bloch wall exchange force, and coercive force.

After the transferred magnetic domains in the amplifying layer $A_1$ are enlarged, they are read out by the magnetic Kerr effect.

Figure 1E:
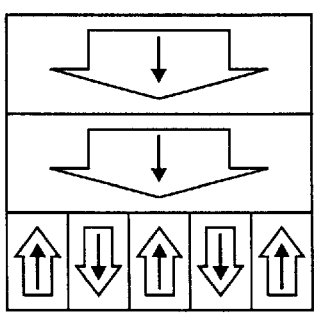

FIG. 1E: Vanishing of the Copied Magnetic Domains

After reading the copied magnetic domains in the amplifying layer $A_1$ making use of the magnetic Kerr effect, the laser beam irradiation is interrupted or the power of the laser beam is reduced. This in turn results in a drop in the temperature of the amplifying layer $A_1$, control layer $C_2$, and recording layer $R_3$. If the interface wall exchange force between the recording layer $R_3$ and the control layer $C_2$ decreases due to the temperature drop, then the copied magnetic domains in the control layer $C_2$ diminish to nil due to the Bloch wall exchange force, so that the magnetization of the regions that were once the magnetic domains in the control layer $C_2$ can return back to the same direction as the circumference, viz., the direction of the initializing magnetic field $H_I$.

If the interface wall exchange force between the amplifying layer $A_1$ and the control layer $C_2$ increases due to the temperature drop, on the other hand, then the copied magnetic domains in the amplifying layer $A_1$ diminishes to nil due to the interface wall exchange force between the amplifying layer $A_1$ and the control layer $C_2$, so that the magnetization of the amplifying layer $A_1$ can return back to the direction of the initializing magnetic field, as in the case of the control layer $C_2$.

Consequently, the magnetic domains return back to the state shown in FIG. 1B due to interruption of laser beam irradiation or the decrease in laser beam power.

Case Where the Magnetic Domains Have Magnetization in the Reverse Direction to the Reading Magnetic Field An account is next given of the reading of some magnetic domains out of the magnetic domains recorded in the recording layer $R_3$, viz., those having magnetization in the reverse direction to the reading magnetic field or those having magnetization shown by downward arrows in FIGS. 1A to 1E.

In this case, too, the magnetic domains in the recording layer $R_3$ are copied to the control layer $C_2$, and amplifying layer $A_1$, respectively. Since the copied magnetic domains have magnetization in the same direction as the initializing magnetic field, however, the state of magnetization of the control layer $C_2$, and amplifying layer $A_1$ remains unchanged so that the same state of magnetization can be maintained throughout the reading process. In this state, the direction of magnetization of the amplifying layer $A_1$ is read out by the magnetic Kerr effect. Throughout this reading process of magnetic domains, it is required that the magnetization of the copied magnetic domains in both layers be not inverted.

Reading Condition (Construction I)

For the aforesaid reading process, it is required that, at a temperature of the magnetic multilayer upon laser beam irradiation for reading, magnetic domains be copied to the control layer $C_2$, and amplifying layer $A_1$ without affecting the recording layer $R_3$. To this end, it is preferable that the Curie temperature $Tc_{A1}$ of the amplifying layer $A_1$, and the Curie temperature $Tc_{C2}$ of the control layer $C_2$ are lower than the Curie temperature $Tc_{R3}$ of the recording layer $R_3$. However, $Tc_{A1}$, and $Tc_{C2}$ should be higher than room temperature. The same is also true of constructions II, and III to be described later.

Figure 8:
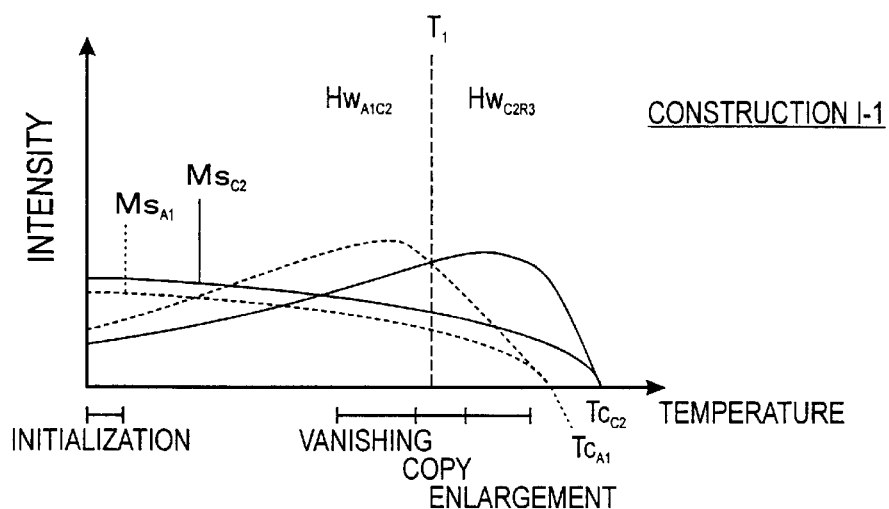
FIG. 8 is a graph illustrative of the magnetic properties of each magnetic layer in the magneto-optical recording medium according to the present invention, and the effective magnetic field caused by an interface wall between magnetic layers therein.

In construction I-1, let $Hw_{C2R3}$ denote the effective magnetic field caused by interface wall between it and the recording layer $R_3$, on control layer $C_2$ and $Hw_{A1C2}$ denote the effective magnetic field caused by interface wall between it and the control layer $C_2$ on the amplifying layer $A_1$. It is then required that, in a range of temperature that is higher than room temperature and lower than $Tc_{A1}$ and $Tc_{C2}$, a temperature $T_1$ at which $$Hw_{A1C2}=Hw_{C2R3}$$

exist, and a temperature at which $Hw_{A1C2}$ reaches a maximum exist on a side of temperature that is lower than $T_1$ while a temperature at which $Hw_{C2R3}$ reaches a maximum exist on a side of temperature that is higher than $T_1$, as shown in FIG. 8. This requirement is a condition common to all the sub-constructions included in construction I, to say nothing of construction I-1. In other words, this condition should be satisfied in constructions I-2, and I-3, too, which will be described later (and are illustrated in FIGS. 9 to 12). Hereinafter, this condition will be called reading condition I.

Next, an account is given of the influence the condition shown in FIG. 8 has on the reading process. Shown in FIG. 8 are the saturation magnetization $Ms_{A1}$ and Curie temperature $Tc_{A1}$ of the amplifying layer $A_1$, and the saturation magnetization $Ms_{C2}$ and Curie temperature $Tc_{C2}$ of the control layer $C_2$.

In order not to allow the copied magnetic domains in the control layer $C_2$ to be enlarged, it is required that the interface wall exchange force between the control layer $C_2$ and the recording layer $R_3$ be large as already noted. As shown in FIG. 8, however, the effective magnetic field caused by interface wall $Hw_{C2R3}$ between both layers is large at the temperature of the magnetic multilayer upon laser beam irradiation; the copied magnetic domains in the control layer $C_2$ are not enlarged.

To enlarge the copied magnetic domains in the amplifying layer $A_1$, on the other hand, it is required that the interface wall exchange force between the amplifying layer $A_1$ and the control layer $C_2$ remain weak as already noted. In the vicinity of the temperature at which the copied magnetic domains are enlarged, viz., the maximum temperature reached upon laser beam irradiation, however, the effective magnetic field caused by interface wall $Hw_{A1C2}$ between both layers remains so small that the copied magnetic domains in the amplifying layer $A_1$ can be enlarged.

As mentioned above, the copied magnetic domains in the control layer $C_2$ diminish to nil under the action of the Bloch wall. Here let $Hw_{C2}$ denote the effective magnetic field caused by Bloch wall of the control layer $C_2$, $Hw_{C2R3}$ indicate the effective magnetic field caused by interface wall of the control layer $C_2$ between it and the recording layer $R_3$, $Hd_{C2}$ represent the demagnetizing field of the control layer $C_2$, and Hr stand for the strength of the reading magnetic field. If $$Hw_{C2} > Hw_{C2R3} - Hd_{C2} + Hr$$

is satisfied as will be described later, then the copied magnetic domains in the control layer $C_2$ diminish to nil. If $Hw_{C2R3}$ becomes small upon a drop in the temperature of the magnetic multilayer due to interruption of laser beam irradiation or the decrease in laser beam power, therefore, the copied magnetic domains in the control layer $C_2$ can then diminish and vanish, as can be seen from FIG. 8. It is to be noted that $Hw_{C2}$ is given by equation (a):

$$Hw_{C2} = \sigma w_{C2}/(2Ms_{C2} \cdot r_{C2})$$

Here $\sigma W_{C2}$, and $Ms_{C2}$ are the wall energy, and saturation magnetization of the control layer $C_2$, respectively, and $r_{C2}$ is the radii of the copied magnetic domains in the control layer $C_2$.

To allow the copied magnetic domains in the amplifying layer $A_1$ to diminish to nil, on the other hand, it is required that the effective magnetic field caused by interface wall $Hw_{A1C2}$ between the amplifying layer $A_1$ and the control layer $C_2$ on $A_1$ be increased upon a drop in the temperature of the magnetic multilayer due to the interruption of laser beam irradiation or the decrease in laser beam power as mentioned above. As can be seen from FIG. 8, $Hw_{A1C2}$ becomes large upon the drop in the temperature of the magnetic multilayer following the interruption of laser beam irradiation, so that the copied magnetic domains in the amplifying layer $A_1$ can diminish to nil.

In construction I-1, it is further preferable that the following conditions are satisfied. It is to be noted that the conditions given below, too, are common to the sub-constructions included in construction I-1.

Copy Condition I

Here let $Hc_{A1}$ and $Hd_{A1}$ denote the coercive force and demagnetizing field of the amplifying layer $A_1$, $Hc_{C2}$ and $Hd_{C2}$ indicate the coercive force and demagnetizing field of the control layer $C_2$, $Hw_{C2R3}$ represent the effective magnetic field caused by the interface wall between the control layer $C_2$ and the recording layer $R_3$, on $C_2$ $Hw_{A1C2}$ refer to the effective magnetic field caused by the interface wall between the amplifying layer $A_1$ and the control layer $C_2$, on $A_1$ and Hr stand for the reading magnetic field. To achieve sufficient copy of the magnetic domains from the recording layer $R_3$ to the control layer $C_2$, it is required to satisfy the following condition (I-1-1):

$$Hw_{C2R3} + Hr > Hc_{C2} - Hd_{C2}$$

To achieve sufficient copy of the magnetic domains from the control layer $C_2$ to the amplifying layer $A_1$, it is required to satisfy the following condition (I-1-2):

$$Hw_{A1C2} + Hr > Hc_{A1} - Hd_{A1}$$

It is here to be noted that $$Hw_{A1C2} = \sigma w_{A1C2}/(2Ms_{A1} t_{A1})$$

where $\sigma w_{A1C2}$ means the interface wall energy between the amplifying layer $A_1$ and the control layer $C_2$ adjacent thereto. In the present disclosure, ($\sigma w_{C2A1}$, too, has the same meanings as mentioned just above. In the aforesaid equation, $Ms_{A1}$ means the saturation magnetization of the amplifying layer $A_1$, and $ts_{A1}$ means the thickness of the amplifying layer $A_1$. The effective magnetic field caused by interface wall may be empirically found by measuring minor loops using a Kerr effect measuring device, as will be described.

Irrespective of whether the magnetization of the magnetic domains is in the same direction as or in the reverse direction to the reading magnetic field, conditions (I-1-1), and (I-1-2) should be satisfied.

Non-inverting Condition I

When the magnetization of the copied magnetic domains is in the reverse direction to the reading magnetic field, it is required that the magnetization of the copied magnetic domains be not inverted by the application of the reading magnetic field. The condition to this end (the non-inverting condition) is given by $$Hr < Hw_{C2R3} + Hc_{C2} - Hd_{C2} \qquad \text{condition (I-2-1)}$$

for the control layer $C_2$, and $$Hr < Hw_{A1C2} + Hc_{A1} - Hd_{A1} \qquad \text{condition (I-2-2)}$$

for the amplifying layer $A_1$.

Non-enlarging Condition I, and Enlarging Condition I

When the magnetization of the copied magnetic domains is in the same direction as the reading magnetic field, it is required that the reading magnetic field be applied to enlarge only the copied magnetic domains in the amplifying layer $A_1$ without enlarging the transferred magnetic domains in the control layer $C_2$. The condition not to enlarge the transferred magnetic domains in the control layer $C_2$ (the non-enlarging condition) is given by $$Hr < Hw_{C2R3} - Hw_{C2A1} - Hd_{C2} + Hw_{C2} \qquad \text{condition (I-3)}$$

where $Hw_{C2}$ is the effective magnetic field caused by Bloch wall of the control layer $C_2$. The condition to enlarge the copied magnetic domains in the amplifying layer $A_1$ is given by $$Hr > Hw_{A1C2} - Hd_{A1} + Hw_{A1} \qquad \text{condition (I-4)}$$

where $Hw_{A1}$ is the effective magnetic field caused by Bloch wall of the amplifying layer $A_1$.

The reason why the transferred magnetic domains in the control layer $C_2$ are not enlarged can be that upon enlargement of the copied magnetic domains, the Bloch wall exchange force decreases as can be seen from the aforesaid equation (a), and consequently the copied magnetic domains do not vanish when the exchange force between the control layer $C_2$ and the recording layer $R_3$ decreases.

To satisfy the aforesaid enlarging condition and the non-inverting condition as already noted at the same temperature, it is required to simultaneously satisfy conditions (I-2-2), and (I-4):

$$Hr < Hw_{A1C2} + Hc_{A1} - Hd_{A1} \qquad (I-2-2)$$

$$Hr > Hw_{A1C2} - Hd_{A1} + Hw_{A1} \qquad (I-4)$$

In other words, it is required to satisfy $$Hc_{A1} > Hw_{A1}$$

at the temperature at which the transferred magnetic domains in the amplifying layer $A_1$ are enlarged.

Vanishing Condition I

The copied magnetic domains in the amplifying layer $A_1$, and control layer $C_2$ should have already vanished when magnetic domains adjacent thereto are read. Consequently, it is required that the copied magnetic domains can vanish in the presence of the reading magnetic field. When the magnetization of the copied magnetic domains is in the same direction as the reading magnetic field, the condition for allowing the copied magnetic domains in the respective magnetic layers to vanish at the same time in the presence of the reading magnetic field (the vanishing condition) is given by $$Hw_{C2} > Hw_{C2R3} - Hd_{C2} + Hr \qquad \text{condition (I-5-1)}$$

for the control layer $C_2$, and $$Hw_{A1C2} > Hr - Hw_{A1} - Hd_{A1} \quad \text{condition (I-5-2)}$$

for the amplifying layer $A_1$. These conditions should be satisfied at a temperature reached following the interruption of laser beam irradiation or the decrease in laser beam power.

Construction I-2

In this construction, a control layer $C_2$, or the control layer $C_2$ and an amplifying layer $A_1$ are formed of a ferrimagnetic material having a compensation temperature in a range of temperature that is higher than room temperature, so that the aforesaid reading condition I can be easily satisfied.

Figure 9:
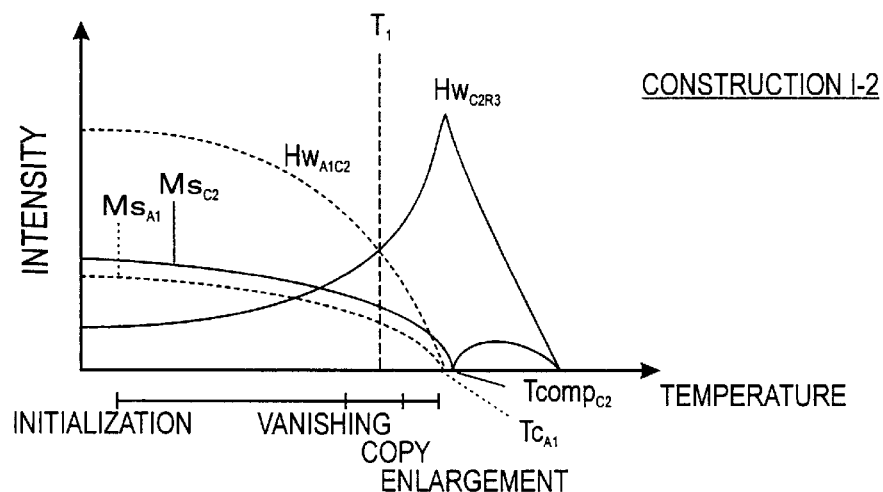
FIG. 9 is a graph illustrative of the magnetic properties of each magnetic layer in the magneto-optical recording medium according to the present invention, and the effective magnetic field caused by interface wall between magnetic layers therein.

The reading process, and reading condition for construction I-2 are explained with reference to FIG. 9. In FIG. 9, it is to be noted that only the control layer $C_2$ has a compensation temperature.

When the control layer $C_2$ comprising a composition having not a compensation temperature that is higher than room temperature, $Hw_{A1C2}$, and $Hw_{C2R3}$ changes incidental to temperature changes become small as shown in FIG. 8, often resulting in a small decreasing change with increasing temperature as found in the case of a saturation magnetization curve. This makes it difficult or impossible to satisfy the aforesaid reading condition I. When the control layer $C_2$ has a compensation temperature, however, $Hw_{C2R3}$ shows a maximum value at a compensation temperature $Tcomp_{C2}$ at which $Ms_{C2}$ reaches zero, because $$Hw_{C2R3} = \sigma w_{C2R3}/2Ms_{C2}t_{C2}$$

Consequently, $Hw_{C2R3}$ has always a large value in the vicinity of $Tcomp_{C2}$ with a $Hw_{A1C2}$ vs. $Hw_{C2R3}$ relation as shown in FIG. 9, so that the aforesaid reading condition I can be easily satisfied.

When the control layer $C_2$ is formed of a ferrimagnetic material having a compensation temperature that is higher than room temperature, the initializing magnetic field is in the same direction as the reading magnetic field. This can bring an additional advantage that there is no need of applying the initializing magnetic field independently prior to the application of the reading magnetic field. However, there is no problem even when the initializing magnetic field having the same direction as the reading magnetic field is applied. This is rather preferable because the reading magnetic field has an additional function of promoting the vanishing of the copied magnetic domains when the copied magnetic domains in the control layer $C_2$ vanish.

Figure 10:
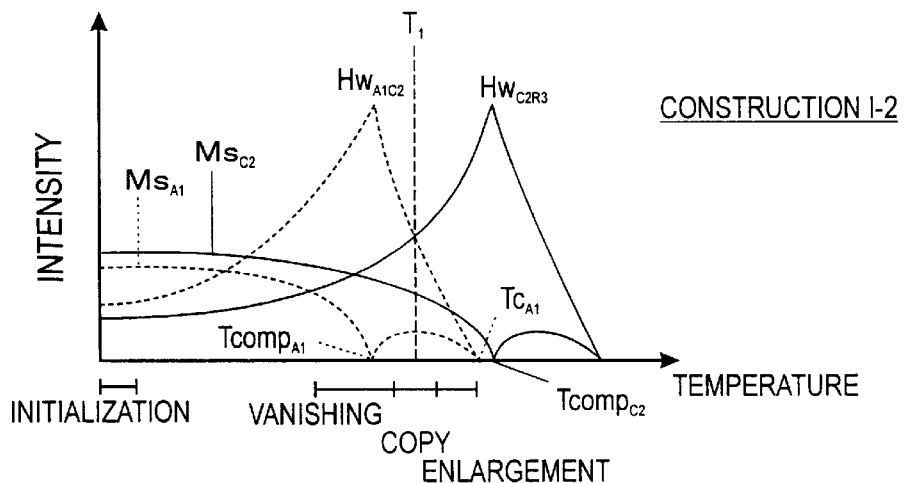
FIG. 10 is a graph illustrative of the magnetic properties of each magnetic layer in the magneto-optical recording medium according to the present invention, and the effective magnetic field caused by interface wall between magnetic layers therein.

Another embodiment of construction I-2 is explained with reference to FIG. 10. In FIG. 10, both an amplifying layer $A_1$ and a control layer $C_2$ have a compensation temperature that is higher than room temperature. If, in this embodiment, $Tcomp_{A1} < Tcomp_{C2}$ wherein $Tcomp_{A1}$ is the compensation temperature of the amplifying layer $A_1$ and $Tcomp_{C2}$ is the compensation temperature of the control layer $C_2$, then both $Hw_{A1C2}$ and $Hw_{C2R3}$ show maximum values at $Tcomp_{A1}$ and $Tcomp_{C2}$ at which $Ms_{A1}$ and $Ms_{C2}$ reach zero. Consequently, it is possible to satisfy the aforesaid condition I easily.

Figure 2A:
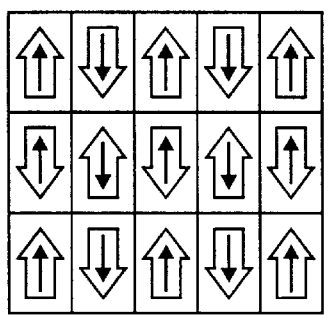
FIGS. 2A to 2E are schematic views illustrative of a reading process for the magneto-optical recording medium according to the present invention.
Figure 2B:
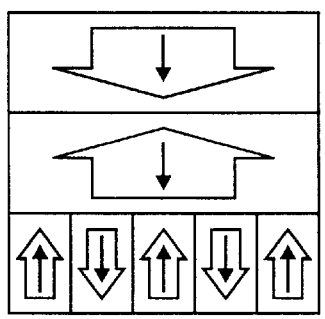
Figure 2C:
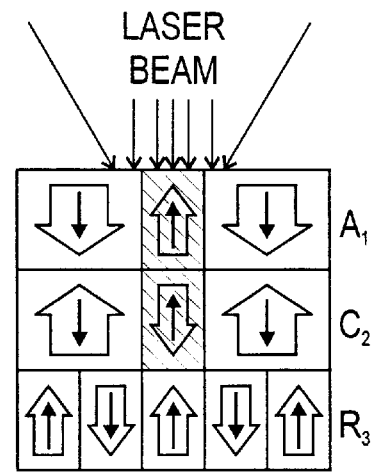
Figure 2D:
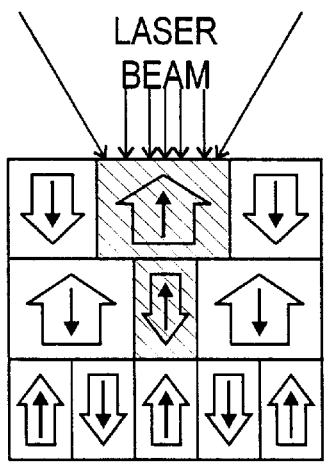
Figure 2E:
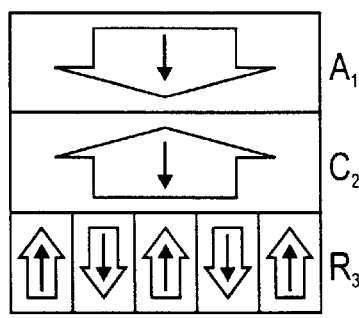

FIGS. 2A to 2E (corresponding to FIG. 9), and FIGS. 3A to 3E (corresponding to FIG. 10) illustrative of the reading process for construction I-2 will be understood just as in FIGS. 1A to 1E illustrative of the reading process for construction I-1, if attention is paid to the direction of the spins in a transition metal element that determine exchange force, and the Kerr effect. In the present invention, however, it is required that during reading and in regions other than the copied magnetic domains in the amplifying layer $A_1$, the spins in the transition metal element be in the opposite direction to the reading magnetic field. Consequently, when the amplifying layer $A_1$ in construction I-2 has not a compensation temperature that is higher than room temperature, it is required that, upon the application of the initializing or reading magnetic filed, the amplifying layer $A_1$ be not magnetized in the direction of the applied magnetic field, as shown in FIG. 2B, so that the control layer $C_2$ can be aligned with the direction of the spins by exchange force. To this end, it is required that $Hw_{A1C2}$ be sufficiently large in the vicinity of room temperature, as shown in FIG. 9. This in turn causes the direction of the spins in the amplifying layer $A_1$ to be aligned with that of the spins in the control layer $C_2$ by exchange force. As a result, the direction of the overall magnetization of the amplifying layer $A_1$ is opposite to the initializing or reading magnetic field, as shown in FIG. 2B.

Construction I-3

In this construction, the magnetic multilayer further comprises between a control layer $C_2$ and a recording layer $R_3$ an exchange force control layer $C_{23}$ that is a magnetic layer.

The reading process, and reading condition for this construction are explained with reference to FIG. 11.

In this construction, it is required that $$Tc_{C2} < Tc_{C23}$$

where $Tc_{C2}$ is the Curie temperature of the control layer $C_2$, and $Tc_{C23}$ is the Curie temperature of the exchange force control layer $C_{23}$.

When the control layer $C_2$ comprises a composition having not a compensation temperature that is higher than room temperature as mentioned above, an $Hw_{C2R3}$ change with a temperature change becomes small, as shown in FIG. 8 for instance, and so it is difficult or impossible to satisfy the aforesaid reading condition I. By the provision of the exchange force control layer $C_{23}$ having a Curie temperature higher than that of the control layer $C_2$, however, it is possible to reduce an $Hw_{C2}R_3$ drop in a high range of temperature, as shown in FIG. 11, and so it is possible to satisfy the aforesaid reading condition I easily although, to this end, the exchange force control layer $C_{23}$ should serve as a domain wall.

Figure 11:
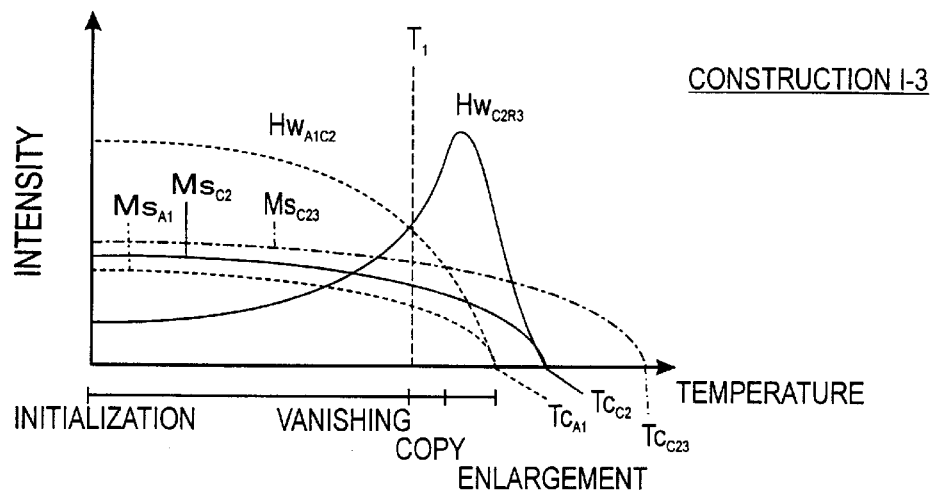
FIG. 11 is a graph illustrative of the magnetic properties of each magnetic layer in the magneto-optical recording medium according to the present invention, and the effective magnetic field caused by interface wall between magnetic layers therein.
Figure 12:
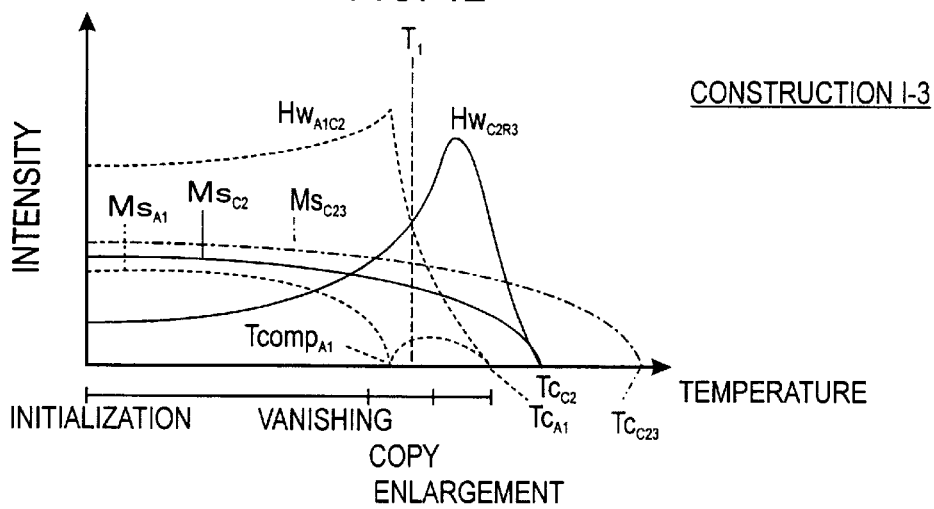
FIG. 12 is a graph illustrative of the magnetic properties of each magnetic layer in the magneto-optical recording medium according to the present invention, and the effective magnetic field caused by interface wall between magnetic layers therein.

In FIG. 11, it is to be noted that $Hw_{A1C2}$ reaches a maximum in a room range of temperature, and decreases monotonically with increasing temperature. However, this construction I-3 is not always limited to such a magnetic field pattern. That is, in a range of temperature that is lower than the temperature at which $Hw_{C2R3}$ reaches a maximum, there is preferably a temperature at which $Hw_{A1C2}$ becomes sufficiently large to such a degree that the copied magnetic domains can vanish under the aforesaid action. As shown in FIG. 12 by way of example, between room temperature and the temperature at which $Hw_{C2R3}$ reaches a maximum there may be a temperature at which $Hw_{A1C2}$ reaches a maximum. FIG. 12 shows the case where the amplifying layer $A_1$ is formed of a ferrimagnetic material having a compensation temperature.

FIGS. 4A to 4E (corresponding to FIG. 11) illustrative of the reading process for construction I-3 will be understood as in FIGS. 1A to 1E illustrative of the reading process for construction I-1. FIGS. 5A to 5E (corresponding to FIG. 12), too, will be understood as in FIGS. 1A to 1E, if attention is paid to the direction of the spins in the transition metal element that determine exchange force, and the Kerr effect.

Construction II

A magneto-optical recording medium used in construction II is similar to that used in construction I with the exception that a switching layer $S_{12}$ is interleaved between an amplifying layer $A_1$ and a control layer $C_2$. The switching layer $S_{12}$ is a magnetic layer having a Curie temperature $Tc_{S12}$ that is higher than room temperature and is lower than the Curie temperature $Tc_{A1}$ of the amplifying layer $A_1$.

Construction II encompasses sub-constructions II-1, II-2, and II-3 to be described later.

Construction II-1

The reading process for construction II-1 that is a basic makeup of construction II, together with details of the condition required for reading, is explained with reference to FIGS. 6A to 6E as well as FIG. 13.

Reading Process (Construction II-1)

Case Where the Magnetic Domains have Magnetization in the Same Direction as the Reading Magnetic Field An account is first given of the reading of some magnetic domains out of the magnetic domains recorded in the recording layer $R_3$, viz., those having magnetization in the same direction as the reading magnetic field or those having magnetization shown by upward white large arrows in FIGS. 6A to 6E.

FIG. 6A: State of the magnetic domains after recording

The same as in FIG. 1A holds with the exception that magnetic domains having magnetization in the same direction as the recording layer $R_3$ are formed by interface wall exchange force in the switching layer $S_{12}$.

FIG. 6B: Initialization

The same as in FIG. 1B holds with the exception that upon the application of an initializing magnetic filed $H_I$, the magnetization of the switching layer $S_{12}$ is in the same direction as the initializing magnetic field.

FIG. 6C: Copy of the magnetic domains

As in FIG. 1C, the medium is irradiated with a laser beam after the application of the initializing magnetic field, while a reading magnetic field $H_R$ is applied thereto.

As the temperatures of the magnetic layers increase upon laser beam irradiation, the interface wall exchange force between the recording layer $R_3$ and the control layer $C_2$, the interface wall exchange force between the control layer $C_2$ and the switching layer $S_{12}$, and the interface wall exchange force between the switching layer $S_{12}$ and the amplifying layer $A_1$ become strong. This in turn causes the recorded magnetic domains in the recording layer $R_3$ to be successively copied to the control layer $C_2$, switching layer $S_{12}$, and amplifying layer $A_1$, so that copied magnetic domains can be formed in the respective layers. The magnetization of the copied magnetic domains in each layer is in the opposite direction to the initializing magnetic field.

FIG. 6D: Enlargement of the copied magnetic domains

As in FIG. 1D, the magnetic domains are not enlarged in the recording layer $R_3$, and control layer $C_2$, but the magnetic domains are enlarged in the amplifying layer $A_1$.

The Curie temperature of the switching layer $S_{12}$ is preferably higher than the temperature at which the magnetic domains are copied and lower than the temperature at which magnetic domain-enlarging force is exerted on the amplifying layer $A_1$. The magnetic domains are copied during temperature increases due to laser beam irradiation, and after copy of the magnetic domains, the temperature of the switching layer $S_{12}$ continues to increase. If the preset Curie temperature of the switching layer $S_{12}$ is lower than those of other magnetic layers, therefore, it is then possible to bring only the switching layer $S_{12}$ up to a temperature higher than its Curie temperature at the time of enlargement of the copied magnetic domains. If the magnetization of the switching layer $S_{12}$ vanishes at the time of enlargement of the copied magnetic domains in the amplifying layer $A_1$, then the exchange force $Hw_{A1S12}$ between the amplifying layer $A_1$ and the switching layer $S_{12}$ reaches zero, as shown in FIG. 13. Thus enlargement of the magnetic domains in the amplifying layer $A_1$ takes place easily.

After the copied magnetic domains in the amplifying layer $A_1$ are enlarged, they are read out by the magnetic Kerr effect.

FIG. 6E: Vanishing of the copied magnetic domains

After reading the copied magnetic domains in the amplifying layer $A_1$ making use of the magnetic Kerr effect, the laser beam irradiation is interrupted to thereby allow the copied magnetic domains to vanish. Upon the interruption of laser beam irradiation or a decrease in laser beam power, the temperature of each magnetic layer lowers. If the interface wall exchange force between the recording layer $R_3$ and the control layer $C_2$ decreases due to the temperature drop, then the transferred magnetic domains in the control layer $C_2$ diminish to nil due to the Bloch wall exchange force, so that the magnetization of the regions that were once the magnetic domains in the control layer $C_2$ can return back to the same direction as the circumference, viz., the direction of the initializing magnetic field $H_I$. If the interface wall exchange force between the switching layer $S_{12}$ and the control layer $C_2$ increases with the temperature decreasing to the Curie temperature of the switching layer $S_{12}$ or lower, then the switching layer $S_{12}$ is magnetized by the interface wall exchange force between it and the control layer $C_2$ in the direction of the initializing magnetic field $H_I$, as in the case of the control layer $C_2$.

If the interface wall exchange force between the amplifying layer $A_1$ and the switching layer $S_{12}$ increases due to the temperature drop, on the other hand, then the enlarged, copied magnetic domains in the amplifying layer $A_1$ diminish to nil due to the interface wall exchange force between the amplifying layer $A_1$ and the switching layer $S_{12}$, so that the magnetization of the amplifying layer $A_1$ can return back to the direction of the initializing magnetic field, as in the case of the switching layer $S_{12}$.

Consequently, the magnetic domains return back to the state shown in FIG. 6B after the interruption of laser beam irradiation or the decrease in laser beam power.

Case Where the Magnetic Domains have Magnetization in the Opposite Direction to the Reading Magnetic Field An account is next given of the reading of some magnetic domains out of the magnetic domains recorded in the recording layer $R_3$, viz., those having magnetization in the opposite direction to the reading magnetic field or those having magnetization shown by downward arrows in FIGS. 6A to 6E.

In this case, too, the magnetic domains in the recording layer $R_3$ are copied to the control layer $C_2$, switching layer $S_{12}$, and amplifying layer $A_1$, respectively. Since the copied magnetic domains have magnetization in the same direction as the initializing magnetic field, however, the state of magnetization of the control layer $C_2$, and amplifying layer $A_1$ remains unchanged so that the same state of magnetization can be maintained throughout the reading process. In this state, the direction of magnetization of the amplifying layer $A_1$ is read out by the magnetic Kerr effect. Throughout this reading process of magnetic domains, it is required that the magnetization of the copied magnetic domains in the control layer $C_2$, and amplifying layer $A_1$ be not inverted.

Reading Condition (Construction II)

Figure 13:
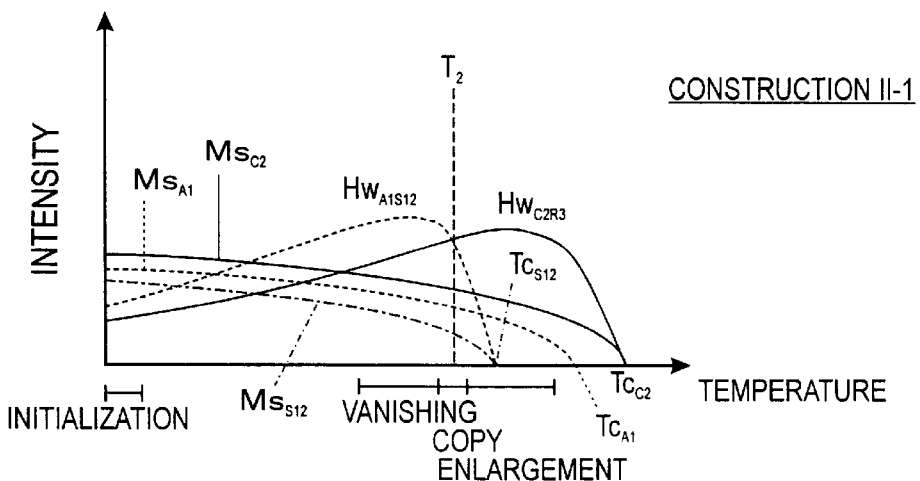
FIG. 13 is a graph illustrative of the magnetic properties of each magnetic layer in the magneto-optical recording medium according to the present invention, and the effective magnetic field caused by interface wall between magnetic layers therein.

In construction II-1, let $Hw_{C2R3}$ denote the effective magnetic field caused by interface wall exchange the control layer $C_2$ and the recording layer $R_3$ on $C_2$ and $Hw_{A1S12}$ denote the effective magnetic field caused by interface wall between the amplifying layer $A_1$ and the switching layer $S_{12}$. It is then required that, in a range of temperature that is higher than room temperature and lower than $Tc_{S12}$, a temperature $T_2$ at which $$Hw_{A1S12} = Hw_{C2R3}$$

exist, and a temperature at which $Hw_{A1S12}$ reaches a maximum exist on a side of temperature that is lower than $T_2$ while a temperature at which $Hw_{C2R3}$ reaches a maximum exist on a side of temperature that is higher than $T_2$, as shown in FIG. 13. This requirement is a condition common to all the sub-constructions included in construction II, to say nothing of construction II-1. In other words, this condition should be satisfied in constructions II-2, and II-3, too, which will be described later. Hereinafter, this condition will be called reading condition II.

Next, an account is given of the influence the condition shown in FIG. 13 has on the reading process. Shown in FIG. 13 are the saturation magnetization $Ms_{A1}$ and Curie temperature $Tc_{A1}$ of the amplifying layer $A_1$, the saturation magnetization $Ms_{C2}$ and Curie temperature $Tc_{C2}$ of the control layer $C_2$, and the saturation magnetization $Ms_{S12}$ and Curie temperature $Tc_{S12}$ of the switching layer $S_{12}$.

In order not to allow the copied magnetic domains in the control layer $C_2$ to be enlarged, it is required that the interface wall exchange force between the control layer $C_2$ and the recording layer $R_3$ be large as already noted. As shown in FIG. 13, however, the interface wall exchange force magnetic field $Hw_{C2R3}$ between both layers is large at the temperature of the magnetic multilayer upon laser beam irradiation; the copied magnetic domains in the control layer $C_2$ are not enlarged.

To enlarge the copied magnetic domains in the amplifying layer $A_1$, on the other hand, it is required that the interface wall exchange force between the amplifying layer $A_1$ and the switching layer $S_{12}$ remain weak. If the temperature at which enlarging force is exerted on the copied magnetic domains in the amplifying layer $A_1$ is equal to or higher than the Curie temperature of the switching layer $S_{12}$, then the interface wall exchange force reaches zero. In FIG. 13, a sharp $Hw_{A1S12}$ decrease with increasing temperature is due to the switching layer $S_{12}$ reaching its Curie temperature $Tc_{S12}$. Such a sharp $Hw_{A1S12}$ decrease makes it very easy to enlarge the copied magnetic domains in the amplifying layer $A_1$.

As mentioned above, the copied magnetic domains in the control layer $C_2$ diminish to nil under the action of the Bloch wall exchange force. Here let $Hw_{C2}$ denote the effective magnetic field caused by Bloch wall on the control layer $C_2$, $Hw_{C2R3}$ indicate the effective magnetic field caused by the interface wall field between the control layer $C_2$ and the recording layer $R_3$ on $C_2$, $Hd_{C2}$ represent the demagnetizing field on the control layer $C_2$, and Hr stand for the reading magnetic field. If $$Hw_{C2} > Hw_{C2R3} - Hd_{C2} + Hr$$

is satisfied as already noted, then the copied magnetic domains in the control layer $C_2$ diminishes to nil. If $Hw_{C2R3}$ becomes small upon a drop in the temperature of the magnetic multilayer due to the interruption of laser beam irradiation or the decrease in laser beam power, therefore, the copied magnetic domains in the control layer $C_2$ can then diminish and vanish, as can be seen from FIG. 13.

To allow the copied magnetic domains in the amplifying layer $A_1$ to diminish to nil, on the other hand, it is required that the interface wall exchange force between the amplifying layer $A_1$ and the switching layer $S_{12}$ be increased upon the drop in the temperature of the magnetic multilayer due to the interruption of laser beam irradiation or the decrease in laser beam power as mentioned above. As can be seen from FIG. 13, however, the effective magnetic field caused by the interface wall $Hw_{A1S12}$ between both layers becomes large upon the drop in the temperature of the magnetic multilayer following the interruption of laser beam irradiation or the decrease in laser beam power, so that the copied magnetic domains in the amplifying layer $A_1$ can diminish to nil.

In construction II-1, it is preferable that the following conditions are further satisfied. It is to be noted that the conditions given below, too, are common to the sub-constructions included in construction II.

Copy Condition II

Here let $Hc_{A1}$ and $Hd_{A1}$ denote the coercive force and demagnetizing field of the amplifying layer $A_1$, $Hc_{S12}$ and $Hd_{S12}$ indicate the coercive force and demagnetizing field of the switching layer $S_{12}$, $Hc_{C2}$ and $Hd_{C2}$ indicate the coercive force and demagnetizing field of the control layer $C_2$, $Hw_{C2R3}$ represent the effective magnetic field caused by the interface wall between the control layer $C_2$ and the recording layer $R_3$, on $C_2$ $Hw_{S12C2}$ represent the effective magnetic field caused by the interface wall between the switching layer $S_{12}$ and the control layer $C_2$ on $S_{12}$, $Hw_{A1S12}$ refer to the effective magnetic field caused by the interface wall between the amplifying layer $A_1$ and the switching layer $S_{12}$ on $A_1$ and Hr stand for the the reading magnetic field. To achieve sufficient copy of the magnetic domains from the recording layer $R_3$ to the control layer $C_2$, it is required to satisfy the following condition (II-1-1):

$$Hw_{C2R3} + Hr > Hc_{C2} - Hd_{C2}$$

To achieve sufficient copy of the magnetic domains from the control layer $C_2$ to the switching layer $S_{12}$, it is required to satisfy the following condition (II-1-2):

$$Hw_{S12C2} + Hr > Hc_{S12} - Hd_{S12}$$

To achieve sufficient copy of the magnetic domains from the switching layer $S_{12}$ to the amplifying layer $A_1$, it is required to satisfy the following condition (II-1-3):

$$Hw_{A1S12} + Hr > Hc_{A1} - Hd_{A1}$$

Irrespective of whether the magnetization of the magnetic domains is in the same direction as or in the opposite direction to the reading magnetic field, conditions (II-1-1), (II-1-2), and (II-1-3) should be satisfied.

Non-inverting Condition II

When the magnetization of the copied magnetic domains is in the opposite direction to the reading magnetic field, it is required that the magnetization of the copied magnetic domains be not inverted by the application of the reading magnetic field. The condition to this end (the non-inverting condition) is given by $$Hr < Hw_{C2R3} + Hc_{C2} - Hd_{C2} \qquad \text{condition (II-2-1)}$$

for the control layer $C_2$, $$Hr < Hw_{S12C2} + Hc_{S12} - Hd_{S12} \qquad \text{condition (II-2-2)}$$

for the switching layer $S_{12}$, and $$Hr < Hw_{A1S12} + Hc_{A1} - Hd_{A1} \qquad \text{condition (II-2-3)}$$

for the amplifying layer $A_1$. When the copied magnetic domains are enlarged, however, it is to be noted that the temperature of the magnetic multilayer exceeds the Curie temperature of the switching layer $S_{12}$, and so $Hw_{S12C2}$ and $Hw_{A1S12}$ reach zero. In other words, the aforesaid condition (II-2-1) is rewritten as $$Hr < Hw_{C2R3} + Hc_{C2} - Hd_{C2} \qquad \text{condition (II-2-1')}$$

while condition (II-2-3) is rewritten as $$Hr < Hc_{A1} - Hd_{A1} \qquad \text{condition (II-2-3')}$$

Non-enlarging Condition II, and Enlarging Condition II

When the magnetization of the copied magnetic domains is in the same direction as the reading magnetic field, it is required that the reading magnetic field be applied to enlarge only the copied magnetic domains in the amplifying layer $A_1$ without enlarging the copied magnetic domains in the control layer $C_2$. If the fact that the switching layer $S_{12}$ has exceeded its Curie temperature is here taken into account, the condition not to enlarge the copied magnetic domains in the control layer $C_2$ (the non-enlarging condition) is then given by $$Hr < Hw_{C2R3} - Hd_{C2} + Hw_{C2} \qquad \text{condition (II-3)}$$

where $Hw_{C2}$ is the effective magnetic field caused by the Bloch wall of the control layer $C_2$. If the fact that the switching layer $S_{12}$ has exceeded its Curie temperature is again taken into consideration, the condition to enlarge the copied magnetic domains in the amplifying layer $A_1$ is then given by $$Hr > Hw_{A1} - Hd_{A1} \qquad \text{condition (II-4)}$$

where $Hw_{A1}$ is the effective magnetic field caused by the Bloch wall of the amplifying layer $A_1$.

The reason why the copied magnetic domains in the control layer $C_2$ are not enlarged is the same as explained in conjunction with construction I.

To satisfy the aforesaid enlarging condition and the aforesaid non-inverting condition at the same temperature, it is required to satisfy the following two conditions at the same time:

$$Hr < Hc_{A1} - Hd_{A1} \qquad \text{condition (II-2-3')}$$

$$Hr > Hw_{A1} - Hd_{A1} \qquad \text{condition (II-4)}$$

In other words, the following condition should be satisfied at the temperature at which the copied magnetic domains in the amplifying layer $A_1$ are enlarged:

$$Hc_{A1} > Hw_{A1}$$

Vanishing Condition II

The copied magnetic domains in the amplifying layer $A_1$, and control layer $C_2$ should have already vanished when magnetic domains adjacent thereto are read. Consequently, it is required that the copied magnetic domains can vanish in the presence of the reading magnetic field. When the magnetization of the copied magnetic domains is in the same direction as the reading magnetic field, the condition for allowing the copied magnetic domains in the respective magnetic layers to vanish at the same time in the presence of the reading magnetic field (the vanishing condition) is given by $$Hw_{C2} > Hw_{C2R3} - Hd_{C2} + Hr \qquad \text{condition (II-5-1)}$$

for the control layer $C_2$, and $$Hw_{A1S12} > Hr - Hw_{A1} - Hd_{A1} \qquad \text{condition (II-5-2)}$$

for the amplifying layer $A_1$. These vanishing conditions should be satisfied at a temperature reached following the interruption of laser beam irradiation or the decrease in laser beam power.

Construction II-2

Figure 14:
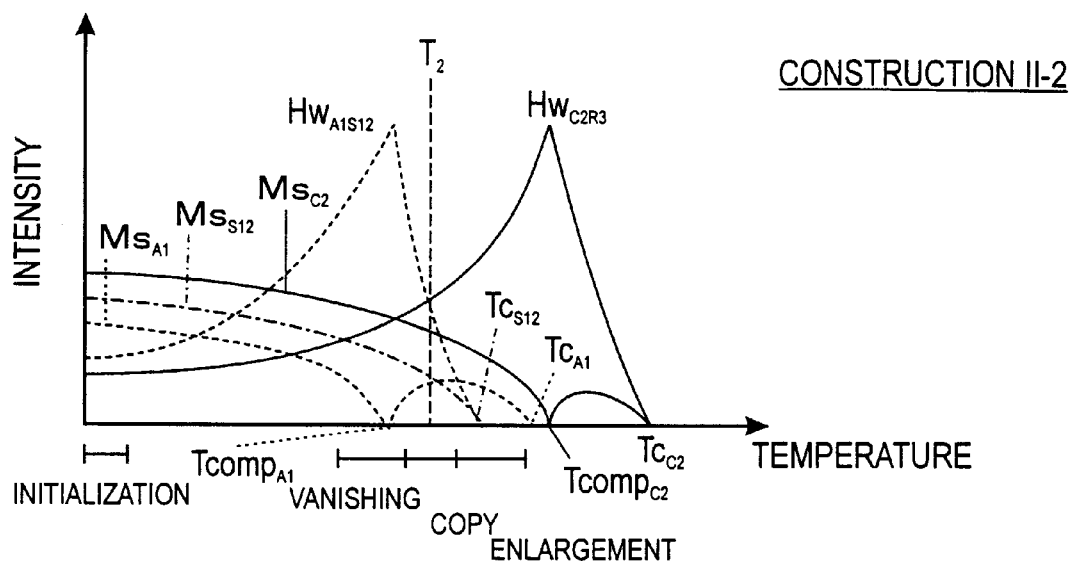
FIG. 14 is a graph illustrative of the magnetic properties of each magnetic layer in the magneto-optical recording medium according to the present invention, and the effective magnetic field caused by interface wall between magnetic layers therein.

In this construction, a control layer $C_2$, or the control layer $C_2$ and an amplifying layer $A_1$ are formed of a ferrimagnetic material having a compensation temperature in a range of temperature that is higher than room temperature as in construction I-2, so that the aforesaid reading condition II can be easily satisfied under the same action as obtained in the aforesaid construction I-2. FIG. 14 shows a specific $Hw_{A1S12}$ vs. $Hw_{C2R3}$ relation in construction II-2, when both the amplifying layer $A_1$ and the control layer $C_2$ have a compensation temperature that is higher than room temperature. In construction II-2 it is required that $$Tc_{S12} < Tcomp_{C2}$$

In FIG. 14 it is further required that $$Tcomp_{A1} < Tc_{S12}$$

$$Tcomp_{A1} < Tcomp_{C2}$$

In an embodiment of FIG. 10 wherein both layers have a compensation temperature that is higher than room temperature, $Hw_{A1C2}$ again decreases gradually to $Tc_{A1}$ at which $Ms_{A1}$ reaches zero. In FIG. 14, however, $Hw_{A1S12}$ drops drastically to zero at the Curie temperature $Tc_{S12}$ of the switching layer, which is lower than $Tc_{A1}$. For this reason, the temperature at which the copied magnetic domains can be enlarged is much lower in FIG. 14 than in FIG. 10, and the copied magnetic domains can be more easily enlarged in a range of temperature that is higher than $Ms_{S12}$.

It is to be noted that when only the control layer $C_{12}$ has a compensation temperature that is higher than room temperature, too, similar effects are obtainable because $Hw_{A1S12}$ reaches zero at $Tc_{S12}$ as in FIGS. 13, and 14.

FIGS. 7A to 7E (corresponding to FIG. 14) illustrative of the reading process for construction II-2 will be understood as in FIGS. 6A to 6E, if attention is paid to the direction of the spins in the transition metal element, which determine exchange force, and the Kerr effect.

Construction II-3

This construction is substantially the same as construction II-1 with the exception that a magnetic multilayer comprises between a control layer $C_2$ and a recording layer $R_3$ an exchange force control layer $C_{23}$ that is a magnetic layer. This exchange force control layer $C_{23}$ is identical with the exchange force control layer $C_{23}$ in construction I-3, and has the same action and effect.

Construction III

Construction III uses a magneto-optical recording medium of the same structure as in construction I or II with the exception that a switching layer $S_{23}$ is interleaved between a control layer $C_2$ and a recording layer $R_3$. The switching layer $S_{23}$ is formed of a ferrimagnetic material having a compensation temperature $Tcomp_{S23}$ that is higher than room temperature, and has longitudinal magnetization at a temperature ranging from room temperature to the vicinity of $Tcomp_{S23}$, and perpendicular magnetization at a temperature higher than the vicinity of $Tcomp_{S23}$. Preferably, the Curie temperature of the switching layer $S_{23}$ is approximately equal to $Tc_{C2}$.

Figure 15:
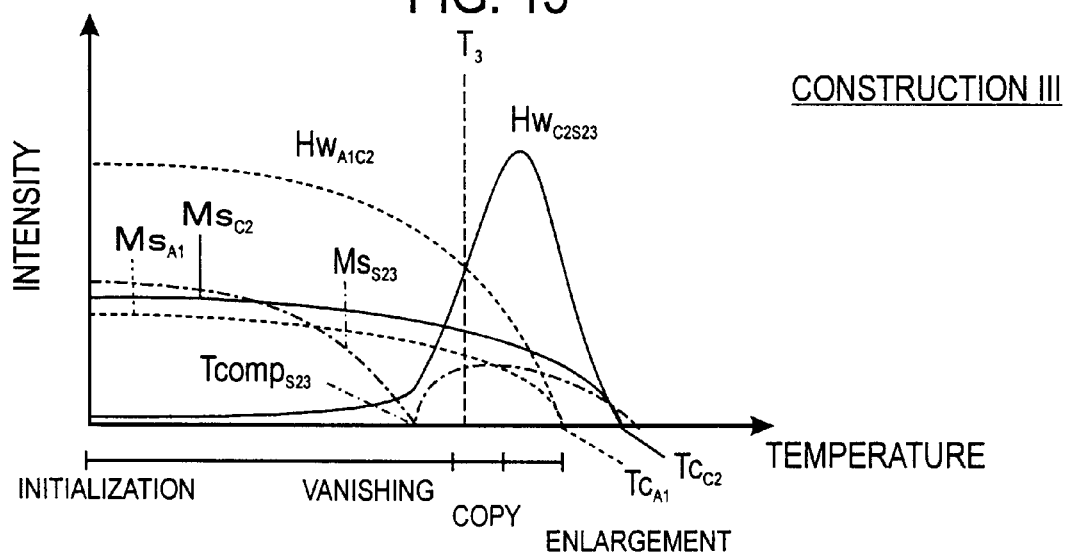
FIG. 15 is a graph illustrative of the magnetic properties of each magnetic layer in the magneto-optical recording medium according to the present invention, and the effective magnetic field caused by interface wall between magnetic layers therein.

In construction III, let $Hw_{C2S23}$ denote the effective magnetic field caused by the interface wall between it and the recording layer $R_3$ on $S_{23}$ and $Hw_{A1C2}$ indicate the effective magnetic field caused by the interface wall between it and the control layer $C_2$ on $A_1$. It is then required that, in a range of temperature that is higher than room temperature and lower than $Tc_{A1}$ and $Tc_{C2}$, a temperature $T_3$ at which $$Hw_{A1C2}=Hw_{C2S23}$$

exist, and a temperature at which $Hw_{A1C2}$ reaches a maximum exist on a side of temperature that is lower than $T_3$ while a temperature at which $Hw_{C2S23}$ reaches a maximum exist on a side of temperature that is higher than $T_3$, as shown FIG. 15. Hereinafter, this condition will be referred to as reading condition III.

Next, an account is given of the influence that reading condition III has on the reading process.

Since the switching layer $S_{23}$ has longitudinal magnetization at a temperature ranging from room temperature to the vicinity of $Tcomp_{S23}$, little or no exchange force is exerted between the switching layer and the recording layer $R_3$, and between the switching layer and the control layer $C_2$. As the temperature exceeds the vicinity of $Tcomp_{S23}$, the switching layer $S_{23}$ begins to have perpendicular magnetization. As a result, $Hw_{C2S23}$ increases while, at the same time, the effective magnetic field caused by the interface wall $Hw_{S23R3}$ between it and the recording layer $R_3$ on $S_{23}$ increase, so that transfer of the magnetic domains can commence.

The magnetic domains are copied, and enlarged upon copy, under the same action as in the aforesaid constructions I, and II. As in construction I-2, the control layer $C_2$, or the control layer $C_2$ and amplifying layer $A_1$ may be formed of a ferrimagnetic material having a compensation temperature that is higher than room temperature. In this case, however, it is unnecessary to interleave an exchange force control layer $C_{23}$ between the control layer $C_2$ and the recording layer $R_3$.

When the copied magnetic domains vanish, $Hw_{C2S23}$ decreases as the temperature of the magnetic multilayer drops and approaches $Tcomp_{S23}$ upon the interruption of laser beam irradiation or a laser beam power decrease. As a result, the copied magnetic domains in the control layer $C_2$ vanish under the same action as in constructions I, and II. As $Hw_{A1C2}$ increases, the copied magnetic domains in the amplifying layer $A_1$ vanish, too.

When, in construction I, the control layer $C_2$ is not formed of a ferrimagnetic material having a compensation temperature that is higher than room temperature, it is often unlikely that $Hw_{C2R3}$ decreases on a low temperature side, thus making it difficult or impossible to vanish the transferred magnetic domains. In construction III, however, it is possible to ensure that the copied magnetic domains vanish, because by the provision of the switching layer $S_{23}$ it is possible to decrease $Hw_{C2S23}$ on the low temperature side.

In construction III, too, the copy, non-inverting, non-enlarging, enlarging, and vanishing conditions exist as in constructions I, and II. To satisfy the enlarging, and non-inverting conditions at the temperature at which the copied magnetic domains in the amplifying layer $A_1$ are enlarged, it is required that $$Hc_{A1}>Hw_{A1}.$$

Structure of Each Magnetic Layer

Details of the structure of each magnetic layer are explained. Structural factors of each magnetic layer such as composition and thickness may be appropriately determined in such a way as to satisfy the aforesaid conditions, and so are not critical. However, the following structures are preferred.

Amplifying Layer $A_1$

This layer comprises a rare earth metal element and a transition metal element as major components. Preferably, the amplifying layer contains at least Gd and/or Dy as the rare earth metal element and at least Fe and/or Co as the transition metal element. A thickness of 10 to 100 nm is preferred. Too thin an amplifying layer results in a C/N drop because information of other magnetic layers may be read out through it during reading, whereas too thick an amplifying layer renders it impossible to increase the interface wall exchange force magnetic field for it, making copy of magnetic domains insufficient. Preferably, the amplifying layer has a Curie temperature of 80 to 300° C. When the amplifying layer has a compensation temperature that is higher than room temperature, it is preferable that the compensation temperature is 20 to 300° C.

Control Layer $C_2$

This layer comprises a rare earth metal element and a transition metal element as major components. Preferably, the control layer contains at least Gd and/or Dy as the rare earth metal element and at least Fe and/or Co as the transition metal element. A thickness of 5 to 50 nm is preferred. Too thin a control layer makes the effective magnetic field caused by the interface wall therefor too large to vanish the copied magnetic domains. Too thick a control layer, on the other hand, renders the effective magnetic field caused by the interface wall therefor too small to copy the magnetic domains. A Curie temperature of 80 to 300° C. is preferred. When the control layer has a compensation temperature that is higher than room temperature, it is preferable that the compensation temperature is 50 to 300° C.

Recording Layer $R_3$

This layer comprises a rare earth metal element and a transition metal element as major components. Preferable, the recording layer comprises at least Tb as the rare earth metal element and at least Fe and Co as the transition metal element. A thickness of at least 10 nm is preferred. Too thin a recording layer makes recording substantially impossible because the recorded magnetic domains are unstable. Although there is no upper limit on thickness, a thickness exceeding 100 nm is unnecessary because of added costs. A Curie temperature of 80 to 400° C. is preferred. It is to be noted that the recording layer may have a compensation temperature.

Exchange Force Control Layer $C_{23}$

This layer comprises a rare earth metal element and a transition metal element as major components. Preferably, the exchange force control layer contains at least Gd and/or Dy as the rare earth metal element and at least Fe and/or Co as the transition metal element. A thickness of 5 to 50 nm is preferred. Too thin a layer renders the aforesaid exchange force control effect insufficient. When the exchange force control layer $C_{23}$ is too thick, on the other hand, it fails to provide magnetic domains as a whole, and so the aforesaid exchange force control effect is unachievable. A Curie temperature of at least 80° C. is preferred.

Switching Layer $S_{12}$

This layer comprises a rare earth metal element and a transition metal element as major components. Preferably, the switching layer contains at least Gd and/or Dy as the rare earth metal element and at least Fe and/or Co as the transition metal element. A thickness of 5 to 50 nm is preferred. Too thin a switching layer renders the cutoff of exchange force difficult, whereas too thick a switching layer makes the interface wall exchange force magnetic field small and, hence, copy of magnetic domains insufficient. A Curie temperature of 80 to 300° C. is preferable.

Switching Layer $S_{23}$

This layer comprises a rare earth metal element and a transition metal element as major components. Preferably, the switching layer contains at least Gd and/or Dy as the rare earth metal element and at least Fe and/or Co as the transition metal element. A thickness of 5 to 50 nm is preferred. Too thin a switching layer renders the cutoff of exchange force insufficient, whereas too thick a switching layer makes the effective magnetic field caused by the interface wall small and, hence, copy of magnetic domains insufficient. A compensation temperature of 80 to 300° C., and a Curie temperature of 100 to 400° C. are preferred.

Enhancement Layer $E_{01}$

The enhancement layer is a magnetic layer that is provided on the side of the magnetic mulilayer nearest to the substrate, viz., between the amplifying layer $A_1$ and the substrate as occasion demands. The enhancement layer has an effect on enhancing the Kerr effect. Here let $Tc_{E01}$ denote the Curie temperature of the enhancement layer $E_{01}$, and $Tc_{A1}$ refer to the Curie temperature of the amplifying layer $A_1$. It is then required that $$Tc_{A1} < Tc_{E01}$$

Unless this relation is satisfied, then the Kerr effect cannot be enhanced. A Curie temperature of 300° C. or higher is preferred.

The enhancement layer comprises a rare earth metal element and a transition metal element as major components. Preferably, this layer comprises at least Gd as the rare earth metal element and at least Fe and Co as the transition metal element. A thickness of 5 to 50 nm is preferred. Too thin an enhancement layer is reduced in terms of the enhancement effect. Too thick an enhancement layer, on the other hand, has an adverse influence on the properties of the amplifying layer, and so renders it difficult to carry out the aforesaid reading process.

Dielectric Layers

In the magneto-optical recording medium of the present invention, usually, dielectric layers are provided between the substrate and the magnetic multilayer; that is, a first dielectric layer is provided on the back side of the magnetic multilayer while a second dielectric layer is provided on the surface side of the magnetic multilayer. These dielectric layers serve as a protector for the magnetic multilayer, and as an enhancer for the Kerr or Faraday effect. As is the case with an ordinary magneto-optical recording medium, each dielectric layer may be made up of various metal oxides, nitrides, and sulfides or a mixture of these metal compounds. Usually, the first dielectric layer has a thickness of the order of 30 to 300 nm while the second dielectric layer has a thickness of the order of 10 to 100 nm.

Reflective Layer

If required, the reflective layer is provided on the surface side of the second dielectric layer. This reflective layer also serves as a heat-radiating layer. The reflective layer has usually a thickness of the order of 10 to 200 nm.

Protective Layer

Usually, the protective layer formed of resin is provided in the form of the outermost layer of the medium. The protective layer has usually a thickness of the order of 1 to 100 μm.

Substrate

In the magneto-optical recording medium of the present invention wherein reading light is incident on the back side of the substrate, the substrate should be substantially transparent to the reading light. For this reason, the substrate is preferably constructed of resin or glass.

EXAMPLE

Example 1 (Construction I-2)

Using a disc form of polycarbonate of 120 mm in outer diameter and 1.2 mm in thickness (with a track pitch of 1.1 μm) as a substrate, a magneto-optical recording disc sample I-2-1 was prepared as follows.

First Dielectric Layer

The first dielectric layer of 60 nm in thickness was prepared by forming a silicon nitride film by a sputtering process using an Si target in an $Ar+N_2$ atmosphere.

Each Magnetic Layer in Magnetic Multilayer

Each magnetic layer was prepared by a sputtering process in an Ar atmosphere.

Second Dielectric Layer

The second dielectric layer of 40 nm was prepared as in the case of the first dielectric layer.

Protective Layer

The protective layer of about 5 μm in thickness was prepared by coating an ultraviolet radiation-curing type resin by a spin coating process, and curing the resin by exposure to ultraviolet radiation.

Set out in Table 1 are the composition, thickness, and Curie temperature (Tc) of each magnetic layer. Compensation temperatures (Tcomp) some magnetic layers have are also shown Table 1. The composition of each magnetic layer was measured with an Auger analyzer after the estimation of properties to be described later. The thickness of each magnetic layer was calculated from a sputtering rate, and a sputtering time. The sputtering rate was determined from the sputtering time, and an actually found thickness of a thick film formed by long-term sputtering under the same conditions as those for actual film formation. The Curie temperature, and compensation temperature of each magnetic layer were found by forming a magnetic single layer sandwiched between dielectric layers on a glass substrate to prepare a test sample, and determining a hysteresis loop of this sample in a range of temperature ranging from room temperature to a temperature at which a Curie temperature was identified.

TABLE 1

| | Construction I-2 | | | |
|---|---|---|---|---|
| Magnetic Layer | Composition | Thickness (nm) | Tc (° C.) | Tcomp (° C.) |
| Amplifying Layer $A_1$ | Gd—Fe—CO | 30 | 220 | 120 |
| Control Layer $C_2$ | Gd—Fe—CO | 15 | 250 | 230 |
| Recording Layer $R_3$ | Tb—Fe—CO | 40 | 280 | — |

Estimation of Properties

The properties of the sample were estimated with an optical disc-estimating device under the following measuring conditions:

Recording Conditions
  Laser wavelength: 680 nm
  Numerical aperture NA: 0.55
  Recording power: 8 mW
  Recording magnetic field: 300 Oe
  Relative linear velocity: 8 m/s
  Optical modulation recording: 8 MHz frequency
Reading Conditions
  Laser wavelength: 680 nm
  Numerical aperture NA: 0.55
  Reading power: 2.5 mW
  Reading magnetic field: 200 Oe
  Relative linear velocity: 8 m/s
  Optical modulation reading: 16 MHz frequency As a result of recording and reading under the aforesaid conditions, the carrier to noise rate C/N was 45 dB.

As in the aforesaid sample, a first dielectric layer, an amplifying layer $A_1$, a control layer $C_2$, a recording layer $R_3$, and a second dielectric layer were formed on a glass substrate to prepare a test sample. The test sample was measured for the dependence of its hysteresis loop on temperature using a Kerr effect measuring device. For this measurement, the directions of magnetization of the magnetic layers were aligned by means of an initializing magneto. The minor loop of the amplifying layer $A_1$ was then measured while a magnetic field was applied to such a degree that the magnetization of the recording layer $R_3$ was not inverted to thereby find the dependence of $Hw_{A1C2}$ on temperature. The dielectric, and magnetic layers were formed on a glass substrate in the same manner as mentioned just above with the exception of the amplifying layer $A_1$ to prepare a test sample. This sample was also measured for the dependence of $Hw_{C2R3}$ on temperature using a Kerr effect measuring device. Consequently, it was confirmed that the temperature $T_1$ at which $$Hw_{A1C2}=Hw_{C2R3}$$

is 170° C., and that the temperature at which $Hw_{A1C2}$ reaches a maximum exists on a side of temperature that is lower than $T_1$ while the temperature at which $Hw_{C2R3}$ reaches a maximum exists on a side of temperature that is higher than $T_1$. Thus, this sample was found to satisfy the aforesaid reading condition I.

Example 2 (Construction I-2)

A magneto-optical recording disc sample was prepared following Example 1 with the exception that a magnetic multilayer was constructed as shown in Table 2.

TABLE 2

Construction I-2

| Magnetic Layer | Composition | Thickness (nm) | Tc (° C.) | Tcomp (° C.) |
|---|---|---|---|---|
| Amplifying Layer $A_1$ | Gd—Fe—Co | 30 | 220 | — |
| Control Layer $C_2$ | Gd—Fe—Co | 15 | 250 | 230 |
| Recording Layer $R_3$ | Tb—Fe—Co | 40 | 280 | — |

By similar measurement as in Example 1, this sample was found to have a C/N of 44 dB.

A test sample was prepared as in Example 1, and measured as in Example 1. As a result, it was found that the aforesaid reading condition I is satisfied, and that the temperature $T_1$ at which $$Hw_{A1C2}=Hw_{C2R3}$$

is 170° C.

Example 3 (Construction I-3)

A magneto-optical recording disc sample I-3 was prepared as in Example 1 with the exception that a magnetic multilayer was constructed as shown in Table 3.

TABLE 3

Construction I-3

| Magnetic Layer | Composition | Thickness (nm) | Tc (° C.) | Tcomp (° C.) |
|---|---|---|---|---|
| Amplifying Layer $A_1$ | Gd—Fe—Co | 30 | 220 | — |
| Control Layer $C_2$ | Gd—Fe—CO | 15 | 250 | — |
| Exchange Force Control Layer $C_{23}$ | Gd—Fe—CO | 15 | 280 | — |
| Recording Layer $R_3$ | Tb—Fe—CO | 40 | 280 | — |

By similar measurement as in Example 1 with the proviso that an initializing magnetic field of 2,000 Oe was applied, this sample was found to have a C/N of 43 dB.

A test sample was prepared as in Example 1, and measured as in Example 1. As a result, it was found that the aforesaid reading condition I is satisfied, and that the temperature $T_1$ at which $$Hw_{A1C2}=Hw_{C2R3}$$

is 180° C.

Example 4 (Construction II-2)

A magneto-optical recording disc sample II-2 was prepared as in Example 1 with the exception that a magnetic multilayer was constructed as shown in Table 4.

TABLE 4

Construction II-2

| Magnetic Layer | Composition | Thickness (nm) | Tc (° C.) | Tcomp (° C.) |
|---|---|---|---|---|
| Amplifying Layer $A_1$ | Gd—Fe—Co | 30 | 220 | 120 |
| Switching Layer $S_{12}$ | Gd—Fe—Co | 20 | 140 | — |
| Control Layer $C_2$ | Gd—Fe—Co | 15 | 250 | 230 |
| Recording Layer $R_3$ | Tb—Fe—Co | 40 | 280 | — |

By similar measurement as in Example 1, this sample was found to have a C/N of 46 dB.

A test sample was prepared as in Example 1, and measured as in Example 1. As a result, it was found that the aforesaid reading condition II is satisfied, and that the temperature $T_2$ at which $$Hw_{A1S12}=Hw_{C2R3}$$

is 160° C.

Example 5 (Construction III)

A magneto-optical recording disc sample III was prepared as in Example 1 with the exception that a magnetic multilayer was constructed as shown in Table 5.

TABLE 5

Construction III

| Magnetic Layer | Composition | Thickness (nm) | Tc (° C.) | Tcomp (° C.) |
|---|---|---|---|---|
| Amplifying Layer $A_1$ | Gd—Fe—Co | 30 | 220 | — |
| Control Layer $C_2$ | Gd—Fe—Co | 15 | 250 | — |
| Switching Layer $S_{23}$ | Gd—Fe—Co | 30 | 280 | 200 |
| Recording Layer $R_3$ | Tb—Fe—Co | 40 | 280 | — |

By similar measurement as in Example 1 with the proviso that an initializing magnetic field of 2,000 Oe was applied, this sample was found to have a C/N of 45 dB.

A test sample was prepared as in Example 1, and measured as in Example 1. As a result, it was found that the aforesaid reading condition III is satisfied, and that the temperature $T_3$ at which $$Hw_{A1C2}=Hw_{C2S23}$$

is 170° C.

Example 6 (Construction I-2)

A magneto-optical recording disc sample I-2-3 was prepared as in Example 1 with the exception that an enhancement layer $E_{01}$ was provided on a substrate side of the magnetic multilayer therein.

TABLE 6

Construction I-2

| Magnetic Layer | Composition | Thickness (nm) | Tc (° C.) | Tcomp (° C.) |
|---|---|---|---|---|
| Enhancement Layer $E_{01}$ | Gd—Fe—Co | 15 | 330 | — |
| Amplifying Layer $A_1$ | Gd—Fe—Co | 30 | 220 | 120 |
| Control Layer $C_2$ | Gd—Fe—Co | 15 | 250 | 230 |
| Recording Layer $R_3$ | Tb—Fe—Co | 40 | 280 | — |

By similar measurement as in Example 1, this sample was found to have a C/N of 48 dB.

ACTION, AND EFFECT

With the magneto-optical recording medium of the invention for the reading of information recorded at high density by making use of the copy, enlargement, and vanishing of magnetic domains, it is possible to carry out continuous reading by the application of a DC reading magnetic field and irradiation with a pulse-modulated laser beam. Since the high-frequency pulse modulation of the laser beam is easily achievable, recording density can be much higher than would be achievable by a conventional reading method making use of the application of a pulse magnetic field. It is also possible to achieve some considerable improvements in the transfer rate.

We claim:

1. A method of reading a magneto-optical recording medium comprising a substrate, and a magnetic multilayer comprising three magnetic layers or, in order from a surface of said substrate, an amplifying layer $A_1$, a control layer $C_2$, and a recording layer $R_3$ with a magnetic domain recorded therein by magneto-optical recording, which method comprises a process, wherein:

said magnetic multilayer is irradiated with a laser beam while a reading magnetic field providing a magnetic field in one direction is applied to said magnetic multilayer to successively copy said magnetic domain in said recording layer $R_3$ from said control layer $C_2$ to said amplifying layer $A_1$ by a temperature increase due to laser beam irradiation, thereby forming a copies magnetic domain, said copied magnetic domain in said amplifying layer $A_1$ is enlarged by said reading magnetic field, and upon reading of an enlarged copied magnetic domain in said amplifying layer $A_1$, copied magnetic domains in said amplifying layer $A_1$ and said control layer $C_2$ are vanished by interrupting said laser beam irradiation or decreasing laser beam power.

2. A magneto-optical recording medium comprising a substrate, and a magnetic multilayer on a surface side of said substrate, said magnetic multilayer comprising at least three layers or, in order from said surface, an amplifying layer $A_1$, a control layer $C_2$ and a recording layer $R_3$, in which:

upon recording, a magnetic domain is formed in said recording layer $R_3$ by laser beam irradiation and application of a recording magnetic field, and upon reading, said magnetic domain in said recording layer $R_3$ is successively copied by laser beam irradiation and application of a reading magnetic field to said control layer $C_2$ and said amplifying layer $A_1$ to form copied magnetic domains in the respective layers, and a copied magnetic domain in said amplifying domain $A_1$ is enlarged, wherein:

in a range of temperature that is higher than room temperature and lower than a Curie temperature $Tc_{A1}$ of said amplifying layer $A_1$ and a Curie temperature $Tc_{C2}$ of said control layer $C_2$, a temperature $T_1$ at which $$Hw_{A1C2}=Hw_{C2R3}$$

exists, and a temperature at which $Hw_{A1C2}$ reaches a maximum exists on a side of temperature that is lower than $T_1$ while a temperature at which $Hw_{C2R3}$ reaches a maximum exists on a side of temperature that is higher than $T_1$, with the provision that $Hw_{A1C2}$ is an effective magnetic field caused by the interface wall between said amplifying layer $A_1$ and said control layer $C_2$ on said amplifying layer $A_1$ and $Hw_{C2R3}$ is an effective magnetic field caused by the interface wall between said control layer $C_2$ and said recording layer $R_3$ on said control layer $C_2$.

3. The magneto-optical recording medium according to claim 2, wherein said amplifying layer $A_1$ and said control layer $C_2$ are each formed of a ferrimagnetic material having a compensation temperature that is higher than room temperature, and satisfy $$Tcomp_{A1}<Tcomp_{C2}$$

with the provision that $Tc_{A1}$ is the Curie temperature of said amplifying layer $A_1$, $Tcomp_{A1}$ is a compensation temperature of said amplifying layer $A_1$, and $Tcomp_{C2}$ is a compensation temperature of said control layer $C_2$.

4. The magneto-optical recording medium according to claim 2, wherein said control layer $C_2$ is formed of a ferrimagnetic material having a compensation temperature that is higher than room temperature.

5. The magneto-optical recording medium according to claim 2, wherein said magnetic multilayer further comprises an exchange force control layer $C_{23}$ between said control layer $C_2$ and said recording layer $R_3$, and satisfies $$Tc_{C2} < Tc_{C23}$$

where $Tc_{C2}$ is the Curie temperature of said control layer $C_2$ and $Tc_{C23}$ is a Curie temperature of said exchange force control layer $C_{23}$.

6. The magneto-optical recording medium according to claim 2, which, at a temperature at which said copied magnetic domain in said amplifying layer $A_1$ is enlarged, satisfies $$Hc_{A1} > Hw_{A1}$$

where $Hc_{A1}$ is a coercive force of said amplifying layer $A_1$, and $Hw_{A1}$ is an effective magnetic field caused by the Bloch wall on said amplifying layer $A_1$.

7. The magneto-optical recording medium according to claim 2, wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is the Curie temperature of said amplifying temperature $A_1$.

8. A magneto-optical recording medium comprising a substrate, and a magnetic multilayer on a surface side of said substrate, said magnetic multilayer comprising at least four layers or, in order from said surface, an amplifying layer $A_1$, a switching layer $S_{12}$, a control layer $C_2$ and a recording layer $R_3$, in which:
   upon recording, a magnetic domain is formed in said recording layer $R_3$ by laser beam irradiation and application of a recording magnetic filed, and
   upon reading, said magnetic domain in said recording layer $R_3$ is successively copied by laser beam irradiation and application of a reading magnetic field to said control layer $C_2$, said switching layer $S_{12}$ and said amplifying layer $A_1$ to form copied magnetic domains in the respective layers, and a copied magnetic domain in said amplifying domain $A_1$ is enlarged, wherein:
     a Curie temperature $Tc_{S12}$ of said switching layer $S_{12}$ is higher than room temperature, and satisfies $$Tc_{S12} < Tc_{A1}$$

where $Tc_{A1}$ is a Curie temperature of said amplifying layer $A_1$, and p2 in a range of temperature that is higher than room temperature and lower than $Tc_{S12}$, a temperature $T_2$ at which $$Hw_{A1S12} = Hw_{C2R3}$$

exists, and a temperature at which $Hw_{A1S12}$ reaches a maximum exists on a side of temperature that is lower than $T_2$ while a temperature at which $Hw_{C2R3}$ reaches a maximum exists on a side of temperature that is higher than $T_2$, with the provision that $Hw_{A1S12}$ is the effective magnetic field caused by the interface wall between said amplifying layer $A_1$ and said switching layer $S_{12}$ on said amplifying layer $A_1$ and $Hw_{C2R3}$ is the effective magnetic field caused by the interface wall between said control layer $C_2$ and said recording layer $R_3$ on said control layer $C_2$.

9. The magneto-optical recording medium according to claim 8, wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is the Curie temperature of said amplifying temperature $A_1$.

10. The magneto-optical recording medium according to claim 8, wherein said amplifying layer $A_1$ and said control layer $C_2$ are each formed of a ferrimagnetic material having a compensation temperature that is higher than room temperature, and satisfy $$Tcomp_{A1} < Tcomp_{C2}$$

with the provision that $Tc_{S12}$ is the Curie temperature of said switching layer $S_{12}$, $Tcomp_{A1}$ is a compensation temperature of said amplifying layer $A_1$, and $Tcomp_{C2}$ is a compensation temperature of said control layer $C_2$.

11. The magneto-optical recording medium according to claim 8, wherein said control layer $C_2$ is formed of a ferrimagnetic material having a compensation temperature that is higher than room temperature.

12. The magneto-optical recording medium according to claim 8, wherein said magnetic multilayer further comprises an exchange force control layer $C_{23}$ between said control layer $C_2$ and said recording layer $R_3$, and satisfies $$Tc_{C2} < Tc_{C23}$$

where $Tc_{C2}$ is a Curie temperature of said control layer $C_2$ and $Tc_{C23}$ is a Curie temperature of said exchange force control layer $C_{23}$.

13. The magneto-optical recording medium according to claim 8, which, at a temperature at which said copied magnetic domain in said amplifying layer $A_1$ is enlarged, satisfies $$Hc_{A1} > Hw_{A1}$$

where $Hc_{A1}$ is a coercive force of said amplifying layer $A_1$, and $Hw_{A1}$ is an effective magnetic field caused by the Bloch wall on said amplifying layer $A_1$.

14. A magneto-optical recording medium comprising a substrate, and a magnetic multilayer on a surface of said substrate, said magnetic multilayer comprising at least four layers or, in order from said surface, an amplifying layer $A_1$, a switching layer $S_{23}$, a control layer $C_2$ and a recording layer $R_3$, in which:
   upon recording, a magnetic domain is formed in said recording layer $R_3$ by laser beam irradiation and application of a recording magnetic field, and
   upon reading, said magnetic domain in said recording layer $R_3$ is successively copied by said laser beam irradiation and application of a reading magnetic field to said switching layer $S_{23}$, said control layer $C_2$ and said amplifying layer $A_1$ to form copied magnetic domains in the respective layers, and a copied magnetic domain in said amplifying domain $A_1$ is enlarged, wherein:
     said switching layer $S_{23}$ is formed of a ferrimagnetic material having a compensation temperature that is higher than room temperature, and has magnetization in a longitudinal direction at a temperature from room temperature to approximately said compensation temperature, and magnetization in a perpendicular direction at a temperature that is higher than approximately said compensation temperature, and in a range of temperature that is higher than room temperature and lower than a Curie temperature $Tc_{A1}$ of said amplifying layer $A_1$ and a Curie temperature $Tc_{C2}$ of said control layer $C_2$, a temperature $T_3$ at which $$Hw_{A1C2} = Hw_{C2S23}$$

exists, and a temperature at which $Hw_{A1C2}$ reaches a maximum exists on a side of temperature that is lower than $T_3$ while a temperature at which $Hw_{C2S23}$ reaches a maximum exists on a side of temperature that is higher than $T_3$, with the provision that $Hw_{A1C2}$ is an effective magnetic field caused by an interface wall between said amplifying layer $A_1$ and said control layer $C_2$ on said amplifying layer $A_1$ and $Hw_{C2S23}$ is an effective magnetic field caused by an interface wall between said control layer $C_2$ and said switching layer $S_{23}$ on said control layer $C_2$.

15. The magneto-optical recording medium according to claim 14, which, at a temperature at which said copied magnetic domain in said amplifying layer $A_1$ is enlarged, satisfies $$Hc_{A1} > Hw_{A1}$$

where $Hc_{A1}$ is a coercive force of said amplifying layer $A_1$, and $Hw_{A1}$ is an effective magnetic field caused by the Bloch wall on said amplifying layer $A_1$.

16. The magneto-optical recording medium according to claim 14, wherein said magnetic multilayer further comprises between said amplifying layer $A_1$ and said substrate an enhancement layer $E_{01}$ that is a magnetic layer for enhancing Kerr effect, and satisfies $$Tc_{A1} < Tc_{E01}$$

where $Tc_{E01}$ is a Curie temperature of said enhancement layer $E_{01}$, and $Tc_{A1}$ is an Curie temperature of said amplifying temperature $A_1$.

* * * * *

UNITED STATES PATENT AND TRADEMARK OFFICE
CERTIFICATE OF CORRECTION

PATENT NO. : 6,031,793
DATED : 29 February 2000
INVENTOR(S) : Jiro Yoshinari, et al.

It is certified that error appears in the above-indentified patent and that said Letters Patent is hereby corrected as shown below:

Column 29, line 52, delete: "p2"

Column 30, line 44, delete: "the" and insert --a--

Signed and Sealed this

Twenty-fourth Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,031,793
DATED : February 29, 2000
INVENTOR(S) : Jiro Yoshinari et al.

Page 1 of 1

It is certified that error appears in the above-identified patent and that said Letters Patent is hereby corrected as shown below:

Column 28,
Line 12, delete "copies" and insert -- copied --
Line 60, delete "the" (second occurrence) and insert -- a --

Column 29,
Lines 6, 17, and 28, delete "the" and insert -- a --
Lines 62 and 65 delete, "the" (before effective) and insert -- an --

Column 30,
Line 18, delete "the" (second occurrence) and insert -- a --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*